(12) United States Patent
Nair et al.

(10) Patent No.: US 11,949,745 B2
(45) Date of Patent: Apr. 2, 2024

(54) COLLABORATION DESIGN LEVERAGING APPLICATION SERVER

(71) Applicant: GE Precision Healthcare LLC, Milwaukee, WI (US)

(72) Inventors: Vinithchandran Ramachandran Nair, Hoffman Estates, IL (US); Yongjian Bao, Vernon Hills, IL (US); Trivedi Kumar Bodlapati, Aurora, IL (US); Anu Narayanan, Buffalo Grove, IL (US)

(73) Assignee: GE Precision Healthcare LLC, Milwaukee, WI (US)

( * ) Notice: Subject to any disclaimer, the term of this patent is extended or adjusted under 35 U.S.C. 154(b) by 366 days.

(21) Appl. No.: 17/176,389

(22) Filed: Feb. 16, 2021

(65) Prior Publication Data
US 2022/0263907 A1 Aug. 18, 2022

(51) Int. Cl.
*H04L 67/141* (2022.01)
(52) U.S. Cl.
CPC .................................. *H04L 67/141* (2013.01)
(58) Field of Classification Search
CPC .................................................... H04L 67/141
See application file for complete search history.

(56) References Cited

U.S. PATENT DOCUMENTS

| 2009/0172101 | A1* | 7/2009 | Arthursson | G06F 3/0486 709/205 |
| 2013/0208955 | A1* | 8/2013 | Zhao | G16Z 99/00 382/128 |
| 2016/0127428 | A1* | 5/2016 | Flunkert | G06Q 10/101 715/753 |
| 2019/0333650 | A1* | 10/2019 | Wilson | H04L 67/10 |

* cited by examiner

*Primary Examiner* — Ario Etienne
*Assistant Examiner* — Kidest Mendaye

(57) ABSTRACT

Techniques are described for improving the efficiency of collaboration session synchronization between applications, particularly applications that consume heavy application data. In an embodiment, a computer-implemented method comprises employing, by an application server operatively coupled to a processor, a context management server to manage synchronization of usage context information between a first client device and one or more second client devices related to simultaneous usage of an application provided by the application server during a collaboration session established between the first client device and the one or more second client devices. The method further comprises managing, by the application server, synchronization and exchange of application data between the first client device and the one or more second client devices during the collaboration session without sharing the application data with the context management server.

19 Claims, 15 Drawing Sheets

LOCAL DEVICE DEPLOYMENT

COLLABORATION DESIGN LEVERAGING APPLICATION SERVER

TECHNICAL FIELD

This application relates to collaboration applications and more particularly to techniques for improving the efficiency of collaboration session synchronization between applications.

BACKGROUND

The usage of collaboration tools for enabling remote computer users at different locations to simultaneously view or access the same digital content are on the rise. For example, the spread of the coronavirus has led companies around the world to accommodate remote working using network meeting applications to help reduce the spread of the virus while also aiming to limit the impact on productivity. Network meeting applications provide a virtual space in which to hold real-time, synchronous meetings. Such applications can offer live presentations or other objects for meeting participants to review and edit, instant messaging (IM), chat services for communications among the participants, and whiteboards on which participants can provide input. Network meeting applications can also provide, or be integrated with, teleconferencing or video teleconferencing services. Other collaboration applications may provide asynchronous interaction. For example, group members may interact using e-mail or other messaging options, and a collaboration area may be provided where members can review, annotate, comment on, and edit documents.

The current trend in collaboration applications is to have some kind of dedicated, cloud-based software or online space that multiple people access via their own logins. These collaboration tools generally require synchronizing the content being presented to all participants while further synchronizing user interactions with the content. To facilitate this end, the current application data being used and viewed during the collaboration session needs to be distributed between all participants and context changes that occur in response to user interaction with the data as supported by the collaboration application need to be propagated to all participants. Techniques for achieving such synchronization are increasingly difficult as the load associated with the application data being shared is increased. This is particularly an issue in association with enabling collaboration between applications that consume heavy data, such as high volumes of medical image data consumed by medical imaging applications for viewing and editing medical image studies.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described herein that facilitate improving the efficiency of collaboration session synchronization between applications, particularly those applications that consume heavy application data.

According to an embodiment, a system is provided that comprises a memory that stores computer executable components, and a processor that executes the computer executable components stored in the memory. These computer executable components comprise a session creation component that controls generating a collaboration session between a first client device and one or more second client devices in association with simultaneous usage of an application by the first client device and the one or more second client devices, wherein based on the generating, the collaboration session creation component directs an application server for the application to manage synchronization and exchange of application data between the first client device and the one or more second client devices during the collaboration session. The computer executable components further comprise a context management component that controls synchronization of usage context information between the first client device and the one or more second client devices related to the simultaneous usage of the application during the collaboration session.

In one or more implementations, the application server serves both the first client device and the one or more second client devices (e.g., all devices participating in the collaboration session are served by the same application server). In other implementations, the first client device and the one or more second client device can access different instances of the application served by different application servers (e.g., these different application servers are for the same applications, but scaled up to multiple server instances in order to serve an increasing number of clients). With these implementations, the application server comprises a first application server accessed by the first client device in association with a request to initiate the collaboration session and the one or more second client devices access the application via one or more second application servers. The collaboration session creation component further directs the first application server to manage the synchronization and exchange of the application data based on the first application server receiving the request.

In some implementations, the application comprises a web-application simultaneously accessed and employed by the first client device and the one or more second client devices. In this regard, the usage context information can comprise event information regarding user actions (e.g., mouse movements, scroll events, edits to displayed text and image data, etc.) performed in association with interaction with the application data as displayed by the first application and the one or more second applications. For example, in various implementations, the first application and the one or more second applications can include clinical applications that provide for viewing and annotating medical image data and the user actions can include actions pertaining to changing the view of a medical image being displayed, annotating the medical image, scrolling to a next image in a study or series, and the like. In some implementations, the usage context information can also include or relate to metadata associated with the application data. For example, as applied to clinical applications, the usage context information can identify the context of the study being displayed, the context of the patient, and the like. Such metadata can be used by the context management component to ensure all participating clients are accessing the same image study, viewing the same image, discussing the same patient, and so on.

In various implementations, the session creation component and the context management component are deployed at a context management server that is remote from the first application server, and wherein the first application server independently manages the synchronization and the exchange of the application data without distributing the application data to the context management server (e.g., the context management server does not receive the application data during the collaboration session).

In some implementations, the session creation component creates the collaboration session in response to reception of a request from the application server initiated by the first client device, and wherein based on reception of the request, the session creation component generates a session identifier for the collaboration session, assigns the first client device an initiator participant role for the collaboration session, and provides the application server with collaboration session information comprising the session identifier and identifying the first client device as having the participant initiator role. With these implementations, the session creation component controls joining the one or more second client devices to the collaboration session based on the collaboration session information, and wherein based on the joining, the session creation component assigns the one or more second client devices a joining participant role for the collaboration session.

In another embodiment, a system is provided that comprises a memory that stores computer executable components, and a processor that executes the computer executable components stored in the memory. These computer executable components comprise a session creation component that controls generating a collaboration session between a first client device in association with usage of a first application by the first client device and one or more second client devices in association with usage of a second application by the one or more second client devices, wherein based on the generating, the collaboration session creation component directs a first application server for the first application to manage synchronization and exchange of application data between the first client device and the one or more second client devices during the collaboration session. The computer executable components further comprise a context management component that controls synchronization of usage context information between the first client device and the one or more second client devices related to usage of the first application and the second application during the collaboration session.

With this embodiment, the first application and the second application comprise different applications and wherein the second application is served by a second application server, and wherein based on the generating, the session creation component directs the first application server to distribute the application to the one or more second application servers for sharing with the one or more second client devices.

In one or more implementations, the session creation component creates the collaboration session in response to reception of a request from the first application server initiated by the first client device. Based on reception of the request, the session creation component generates a session identifier for the collaboration session, assigns the first client device an initiator participant role for the collaboration session, and provides the first application server with collaboration session information comprising the session identifier and identifying the first client device as having the participant initiator role. The session creation component further controls joining the one or more second client devices to the collaboration session based on the collaboration session information, and wherein based on the joining, the session creation component assigns the one or more second applications a joining participant role for the collaboration session. The session creation component further directs the first application server to share the collaboration session information with the one or more second application servers, and wherein based on sharing the collaboration session information, the one or more second application servers use the collaboration session information to facilitate the joining of the one or more second client devices to the collaboration.

According to another embodiment, a computer-implemented method is provided that comprises employing, by an application server operatively coupled to a processor, a context management server to manage synchronization of usage context information between a first client device and one or more second client device related to simultaneous usage of an application provided by the application server during a collaboration session established between the first client device and the one or more second client devices. The method further comprises managing, by the application server, synchronization and exchange of application data between the first client device and the one or more second client devices during the collaboration session without sharing the application data with the context management server.

In some embodiments, elements described in connection with the disclosed systems can be embodied in different forms such as a computer-implemented method, a computer program product, or another form, and vice-versa.

DETAILED DESCRIPTION

Figure 1:
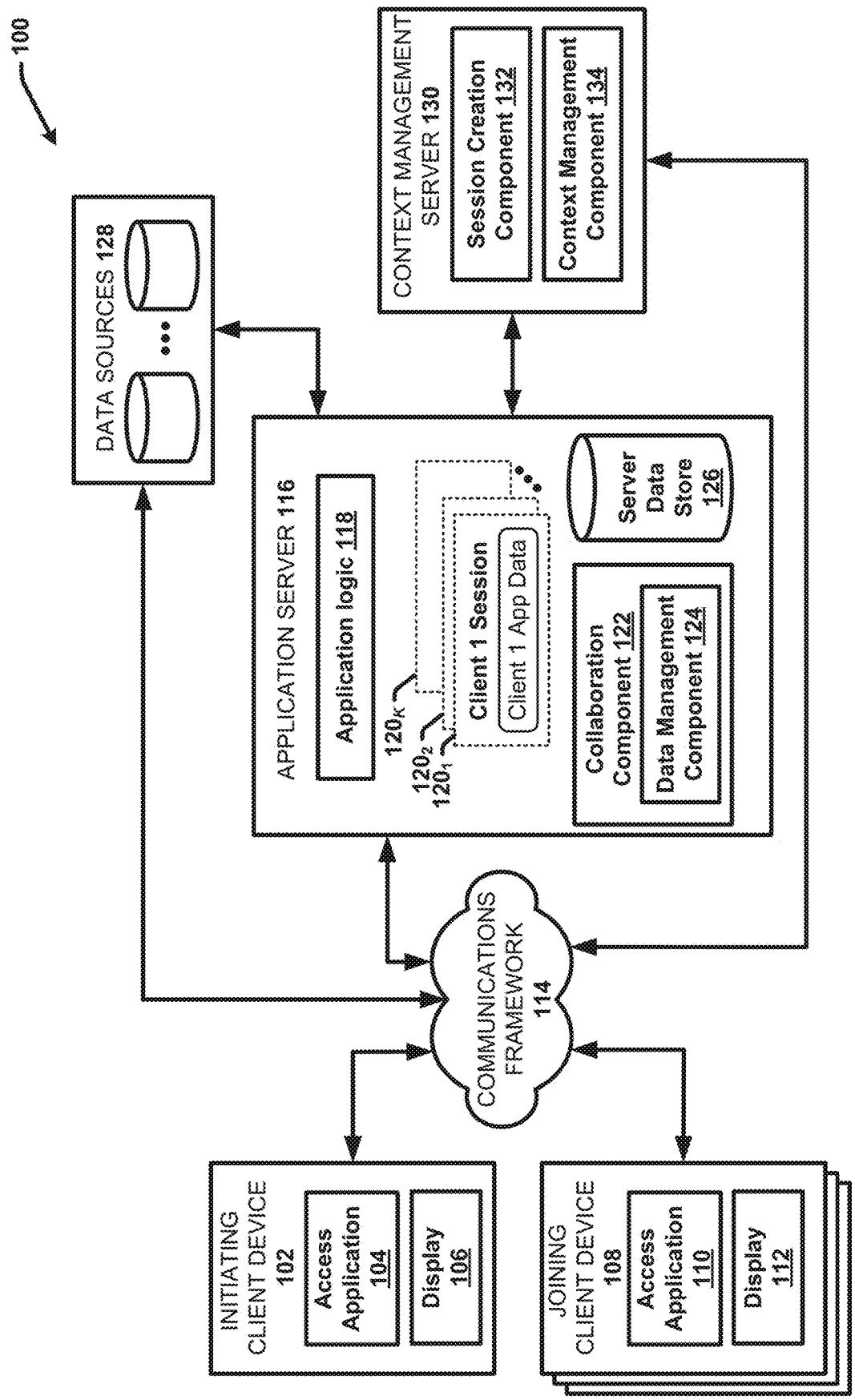
FIG. 1 illustrates a block diagram of an example, non-limiting system that facilitates improving the efficiency of collaboration session synchronization in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate improving the efficiency of collaboration session synchronization between applications, particularly those that consume heavy application data, such as medical imaging applications for viewing and editing medical image studies. These collaboration tools include techniques for performing collaboration sessions between clients using different instances of a same application (referred to herein as in-app collaboration), as well as tools for performing collaboration sessions between clients using different applications that display the same data (referred to herein as cross-app collaboration). For example, as applied to different applications, the disclosed techniques provide for smart synchronization and user-action conversion across different types of applications that display medical image data and across different form factors.

The disclosed techniques improve the efficiency of in-app and cross-app collaboration session synchronization by distributing collaboration session context and data synchronization management between a context management server and the application server or servers. In this regard, the collaboration management system is designed such that the application specific session data state is managed by the application server and the collaboration session related context state is managed by the context management server. The application server of the client that initiates the collaboration session shares the application data with other participants without sharing the application data with the context management server. With this design there is a considerable reduction in the traffic and load on the context management server which improves performance.

In one or more embodiment, different applications participating in a collaboration session connect to the context management server to share usage context information regarding the collaboration context (e.g., a patient chart, an imaging study), as well as cross-app level collaboration events (e.g., context changes, (common) functions applied to the context, etc.). Cross-app context synchronization and collaboration events are propagated to all participating clients of these connected applications so that context and functions can be synchronized among these clients. In addition to the cross-app collaboration events, a participating application can add more fine-granular events and data exchange capabilities to further enhance the collaboration experience for its participating clients. By dividing event and data exchange in two levels and handling these separately (in-app vs. cross-app), the collaboration session network traffic and data processing burden can be optimized, enabling feature-rich, reliable collaboration.

As used herein, the term "initiator" and derivatives thereof are used herein to refer to the entity that initiated a collaboration session. The terms "initiating user," "initiating user account," "initiating client," "initiating client device," "initiating participant," and the like are used herein interchangeably to refer to the entity that initiated a collaboration session. The entities participating in a collaboration session are referred to herein as participants. The term "joiner" and derivatives thereof are used herein to refer to a participant in a collaboration session that joins an established collaboration session with the initiator. The terms "joining user," "joining user account," "joining client," "joining client device," "joining participant," and the like are used herein interchangeably to refer to the entity that joined a collaboration session after an initiator has initiated the collaboration session. In various embodiments, only one participant in a collaboration session can have the role of "initiator" while all other participants will have the role of "joiner."

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that facilitates improving the efficiency of collaboration session synchronization within a single application used by multiple clients (e.g., in-app collaboration) in accordance with one or more embodiments of the disclosed subject matter. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes an application server 116 for an application that supports simultaneous access and utilization by multiple users and/or client devices. These users correspond to a user of an initiating client device 102 and respective users of one or more joining client devices 108. In the embodiment shown, the application provided by the application server 116 is represented by and/or defined by application logic 118.

In various embodiments, the application represented by the application logic 118 can be or include a web-application that can be accessed by client devices (e.g., initiating client 102 and the one or more joining client devices 108) via a communication framework 114 (e.g., the Internet) using a web-browser. For example, in some implementations, the web-application can include an angular-based application. In other implementations, the web-application can be a non-angular web application. Additionally, or alternatively, the application represented by application logic 118 can be or include a thin-client application, a thick-client application, a native client application, a hybrid application or the like.

The communication framework 114 may include any wired or wireless network, such as the Internet, WiMax, wide area cellular, or local area wireless network. The communication framework 114 may also include personal area networks, such as Bluetooth™ and infrared networks. Communications on communications framework 114 may be encrypted or otherwise secured using any suitable security or encryption protocol.

The initiating client device 102 and the one or more joining client devices 108 can respectively include an access application (e.g., access application 104 and access application 110) that provides for accessing the application server 116 and the application logic 118 provided by the application server 116 via a communication framework 114. For example, access application 104 and access application 110 may include a standard web browser, application server 116 may include a web server, and the communication framework 114 may include the Internet. Additionally, or alternatively, the access application 104 and the access application 110 may also include proprietary applications specifically developed for one or more platforms or devices. For example, access application 104 and access application 110 may include one or more instances of an Apple iOS, Android, or WebOS application or any suitable client-side application for use in accessing application server 116 over communications framework 114. In this regard, in some embodiments, access application 104 and access application 110 can correspond to different instances of a same application located on different client devices via which multiple users/clients may access the application server 116 to simultaneously access and employ the application supported by the application logic 118.

The client devices (e.g., the initiating client device 102 and the one or more joining client devices 108) can include various types of input/output computing devices capable of accessing the application server 116 and using the application logic 118. For example, some suitable client devices can include but are not limited to a desktop computer, a laptop computer, a television, an Internet enabled television, a mobile phone, a smartphone, a tablet personal computer (PC), or a personal digital assistant (PDA), a heads-up display (HUD), an augmented reality (AR) device, a virtual reality (VR) device, a wearable device, a medical instrument or device capable of receiving and applying computer readable instructions (e.g., an imaging device, robotics instrument, etc.), and the like.

The client devices can respectively include a display (e.g., display 106 and display 112) for rending application data (e.g., Client 1 App Data) and other information in association with usage of the application provided by the application server 116. The client devices can also include one or more input devices (e.g., a keypad, a touch pad, a keyboard, a mouse, a touchscreen, etc.) to provide for receiving user input in association with usage of the application.

The application server 116 can include any network server or virtual server, such as a file or web server. The application server 116 can include or be operatively coupled to processing circuitry (e.g., one or more processors or microprocessors), memory (e.g., RAM, ROM, and hybrid types of memory), and storage devices (e.g., hard drives, optical drives, and tape drives). The processing circuitry included in application server 116 may execute a server process for supporting/executing the application logic 118 and the computer-executable instructions defined by the collaboration component 122 while the access applications of the client devices (e.g., access application 104 and access application 110) execute a corresponding client process. In some embodiments, a computer-readable medium with computer program logic recorded thereon is included within application server 116.

In this regard, the application logic 118 can include or correspond to computer-executable instructions that can be executed by the application server 116 to perform the operations described. Although not shown, it should be appreciated that the application server 116 can include or be operatively coupled to at least one memory to store the computer executable instructions (e.g., the application logic 118 and other components of the application server 116) and at least one processor to execute the instructions stored in the memory. Examples of said and memory and processor as well as other suitable computer or computing-based elements, can be found with reference to FIG. 8, and can be used in connection with implementing one or more of the systems, devices, or components shown and described in connection with FIG. 1 or other figures disclosed herein.

In some implementations, the application defined by the application logic 118 can provide for accessing and viewing application data stored at one or more external data sources 128 and accessed by the application server 116 via communications framework 114. Additionally, or alternatively, the application data can be stored in the server data store 126, which can be or correspond to a local memory of the application server 116. In this regard, the application server 116 can retrieve application data from one or more external data sources 128 and/or the server data store 126 for provision to the client devices (e.g., initiating client device 102 and/or one or more joining client devices 108) in association with usage of the application defined by the application logic 118 by the client devices. Still in other embodiments, the application data can be stored at and/or provided by the initiating client device 102 and/or the one or more joining client devices 108.

The features and functionalities of the application defined by the application logic 118 can vary. In one or more exemplary embodiments, the application can include a clinical/healthcare application that facilitates accessing, viewing and/or interacting with clinical data. For example, the clinical data can include medical images, laboratory reports, patient health history records, physician/clinician notes, and the like. In some implementations of these embodiments, the clinical application can present the clinical data to healthcare professionals in a clinical environment to facilitate clinical decisions and providing better care. In other implementations of these embodiments, the clinical application can be designed for use by artificial intelligence (AI) model developers and provide for accessing and using the clinical data in association with AI model development.

For example, in some embodiments, the application defined by the application logic 118 can include a medical imaging application that provides visualization and interaction services to clinicians in association with diagnostic reporting. For instance, the client devices (e.g., the initiating client device 102 and the one or more joining client devices 108) can include computers used by different radiologist via which the radiologist accesses and employ the medical imaging application to view and interact with medical images. In this regard, the medical imaging application can provide for viewing imaging studies/medical images and generating reports regarding interpretations/findings associated with the medical images. In some embodiments, the medical imaging application can also provide various tools/ functions for interacting with the medical images. For example, some of these tools/functions can provide for changing image views of a displayed image (e.g., changing perspective, orientation, size, zoom level, etc.), changing the image viewed (e.g., moving to a next image in a series, selecting a new study), and editing the images.

In some embodiments, the medical imaging application can provide for generating three-dimensional (3D) medical images or reconstructed medical images from native image data. Additionally, or alternatively, the medical imaging application can provide various tools that allow users (e.g., clinicians, radiologists, domain experts, artificial intelligence (AI) model developers, etc.) interpreting the medical image data to annotate the data in the clinical execution of a diagnostic interpretation. For example, the application can allow for an authorized user to apply 'markups' on the images or signal artifacts by tagging features/defects of interest in the image data, defining dimensions of the features/defects, (e.g., areas, volumes depths, etc.), and adding descriptive annotation data (e.g., text data, symbols, etc.) to features of interest that further describe relevant characteristics of the features.

In some implementations, the medical imaging application can provide for performing one or more workflows on medical images that involve processing the medical images using one or more medical image processing algorithms compatible with the images and presenting the workflow results/outcomes. In this context, a workflow refers to a set of workflow instructions that define what computer-executed processing steps to apply to the medical image (or images). A workflow consists of an orchestrated and repeatable pattern of service calls to process medical images, execute algorithms and produce outcomes to be consumed by other systems. In various embodiments, the algorithms can include, but are not limited to, image restoration algorithms (e.g., used to improve the quality of the image), image analysis algorithms (e.g., classification/diagnosis models, organ segmentation models, etc.), image synthesis algorithms (e.g., used construct a three-dimensional image based on multiple two-dimensional images images), image enhancement algorithms (e.g., used improve the image by using filters or adding information that will assist with visualization), and image compression algorithms (e.g., used to reduce the size of the image to enhance transmission times and storage required).

In various embodiments, the workflows can be configured to can apply algorithms in different clinical contexts and filter images/studies based on metadata associated therewith (e.g., modality, series, study description etc.). The workflows can also be configured to invoke representational state transfer (REST) services to retrieve information from other systems. The workflows can further be configured to execute algorithms, including executing algorithms and other tasks in parallel. The workflows can also be configured to execute asynchronous tasks and wait for the task to be completed. The workflows can also be configured to evaluate the output of a task and use it as input for another task.

In some implementations, the workflows can include at least one algorithm that that could be used to assist a radiologist to diagnose and treat a disease. For example, a workflow can call one or more algorithms including AI algorithms that can be applied to the medical image to determine probabilities related to a given medical condition of a patient from which the image was obtained. However, the concept of algorithms as used herein are not limited to machine learning (ML) or deep learning (DL) models. For example, in addition to medical image inferencing models, the workflows described herein can integrate various algorithms for filtering input images based on associated metadata (e.g., based on patient related demographics, based on image attributes, and other factors), heuristic algorithms, algorithms for controlling order and timing of service calls throughout the workflow, and other types of algorithms.

In this regard, the clinical application can consume a variety of different clinical data objects. For example, the different clinical data objects can include (but are not limited to): medical images from varying modalities (e.g., which can range in size anywhere from megabytes (MBs) to gigabytes (GBs)), clinical documents (e.g., laboratory reports), patient information (e.g., electronic health record (EHR) information), and the like.

In some embodiments, the clinical data consumed by the clinical/healthcare application can be stored at one or more external data sources 128. With these embodiments, the clinical application can provide for accessing and retrieving the clinical data from the one more external data sources 128 for viewing, editing, sharing, processing, etc., at the client devices in association with usage of the clinical application. The application server 116 can also store the retrieved clinical application data locally at the server data store 126 to facilitate provision of the same clinical application data to multiple client devices/users participating in a collaboration session using the application.

For example, the one or more external data sources 128 can store medical images and/or information related to the medical images, such as metadata describing various attributes of the medical images, radiology reports associated with the medical images, relevant patient information, and the like. The attributes can refer to patient data associated with the medical image such as name, age, previous medical history data, and/or other data relating to the patient and the medical image. Attributes can also describe exam series and image level metadata to identify and/or execute related workflows. For example, the metadata associated with the medical images can include information regarding (but not limited to), image acquisition protocols, image quality, signal noise, image index size, matrix size, resolution, orientation, capture modality, type and dimensions of anatomical features depicted in the image data, image rating, image quality, image storage location (or locations), image capture time, and other features. The metadata tags can also include (but are not limited to) information describing the image type, the anatomical part depicted in the image data, the medical condition/pathology reflected in the image data, patient demographics, and relevant patient medical history factors.

The medical images provided by the one or more data sources 128 can include images captured using essentially any medical imaging modality. For example, the medical images can include but are not limited to: conventional X-ray (XR) images, digital radiography (DX) X-ray images, X-ray angiography (XA) device, panoramic X-ray (PX) images, computerized tomography (CT) images, mammography (MG) images, (including a tomosynthesis device), magnetic resonance imaging (MRI) images, ultrasound (US) images, color flow doppler (CD) images, position emission tomography (PET) images, single-photon emissions computed tomography (SPECT) images, nuclear medicine (NM) images, and other types of medical images. The medical images can also include or be associated with (e.g., as metadata) raw pixel data, waveform data, three-dimensional or depth data, point cloud data and the like.

In various embodiments, the one or more data sources 128 can provide medical images and associated metadata formatted according to the digital in Digital Imaging and Communications in Medicine (DICOM) standard. DICOM is the worldwide standard for handling, storing, printing, and transmitting information in medical imaging. It includes a file format definition and a network communications protocol. DICOM is used worldwide to store, exchange, and transmit medical images. For example, DICOM incorporates standards for the various imaging modalities such as radiography, ultrasonography, computed tomography, magnetic resonance, mammograph, and the like. DICOM includes protocols for image exchange (e.g., via portable media such as DVDs), image compression, 3D visualization, image presentation, and results reporting. Working with imaging data sets of size and complexity scales needed to develop sophisticated AI imaging diagnostic models can be somewhat easier than with other types of datasets due to the wide adoption of DICOM, a standard that has been in place for medical imaging for more than twenty years. For imaging, DICOM fills the role of connecting all the modalities in the hospital. The printers, displays, MRI machines, and other acquisition devices all communicate using DICOM standards.

In some implementations, the one or more external data sources 128 can be or include one or more PACS. A PACS provides economical storage and convenient access to images from multiple modalities (source machine types). Electronic images and reports can be transmitted digitally via a PACS, which eliminates the need to manually file, retrieve, or transport film jackets, the folders used to store and protect X-ray film. The universal format for PACS image storage and transfer is DICOM. Non-image data, such as scanned documents, may be incorporated using consumer industry standard formats like PDF (Portable Document Format), once encapsulated in DICOM.

Additionally, or alternatively, the one or more external data sources 128 can be or include one or more a vendor neutral archive (VNA) systems. A VNA is a medical imaging technology in which images and documents (and potentially any file of clinical relevance) are stored (archived) in a standard format with a standard interface, such that they can be accessed in a vendor-neutral manner by other systems. In this regard, VNAs can collect and store images from multiple modalities and departments (e.g., radiology, cardiology, orthopedic, etc.) and pull everything into one big archive. In addition to DICOM images, VNAs can store data objects not directly related to images or DICOM data, such as human-generated requests and reports, health level 23 clinical document architecture (HL23-CDA) documents, and the like. The VNAs can also employ non-DICOM access protocols, such as Cross-Enterprise Document Sharing (XDS and XDS-I). VNAs can also provide cross-domain identity and code resolution (patient ID, accession number, procedure codes), dynamic DICOM tag morphing, and other adaptable features. The one or more external data sources 128 can also be or include workstations (e.g., deployed at one or more computing devices) where medical images are viewed and/or processed for various purposes (e.g., AI model development workstations, radiologist viewer workstations, annotation workstations, etc.).

In some embodiments, the one or more external data sources 128 can also store various algorithms or models that can be called and executed by the clinical application in association with usage of the clinical application. For example, the one or more external data sources 128 can store various algorithms or models that can be applied to medical image data and other clinical data in association with executing workflows using the clinical application. The algorithms can include, but are not limited to, image restoration algorithms (e.g., used to improve the quality of the image), image analysis algorithms (e.g., classification/diagnosis models, organ segmentation models, etc.), image synthesis algorithms (e.g., used construct a three-dimensional image based on multiple two-dimensional images images), image enhancement algorithms (e.g., used improve the image by using filters or adding information that will assist with visualization), and image compression algorithms (e.g., used to reduce the size of the image to enhance transmission times and storage required).

In one or more embodiments, the application server 116 can establish separate client sessions for each usage instance of the application by a different user and/or client device. For example, in the embodiment shown, different user/client sessions are respectively identified as client sessions $120_{1-K}$. The number K of client sessions supported for running at the same time can be unlimited. The different client devices (e.g., the initiating client device 102 and the one or more joining client device 108) can be located any distance from one another (e.g., from a few feet to thousands of miles). In this context, reference to a" user" refers to an entity (e.g., a human or machine) that uses a client device (initiation client device 102 and/or a joining client device 108) to access and employ an application (e.g., defined by application logic 118) provided by an application server (e.g., application server 116), wherein each usage instance results in a client session for that user and client device. In some embodiments, the user can access and use the application in association with a user account or profile for that user established. In this regard, each client session can be tied to a user, a user account/profile, and/or a client device. In this context, reference to a "participant" in a collaboration session is synonymous with reference to the user, user account/profile, client device and/or client session.

During a client session, the application server 116 provides the corresponding client device with application data accessed and used during the client session. For example, in implementations in which the application defined by the application logic 118 comprises a clinical application, the application server 116 can manage the client sessions by loading the requested clinical data objects (e.g., medical images, clinical documents, studies and etc.) for review at the corresponding client devices.

System 100 provides for establishing and managing a collaboration session within a same application between two or more users accessing and using the application at the same time on different client devices (e.g., joining client device 102 and the one or more client device 108). For example, system 100 facilitates joining two or more client sessions $120_{1-K}$ together in a collaboration session wherein both the content being presented to all participants and the user interactions with the content are synchronized in real-time. During a collaboration session, the current application data being used and viewed by at least one participant needs to be distributed between all participants and context changes that occur in response to user interaction with the application data as supported by the application need to be propagated to all participants.

To facilitate this end, system 100 divides data synchronization management and context synchronization management responsibilities between the application server 116 and a separate context management server 130, respectively. In this regard, the application server 116 can include collaboration component 122 to facilitate establishing a collaboration session between two or more client devices (e.g., initiating client device 102 and one or more joining client devices 108) and/or client sessions $120_{1-K}$. In various embodiments, the collaboration component 122 employs the context management server 130 to generate the collaboration session (e.g., using session creation component 132), which includes assigning a session identifier (ID) for the collaboration session and assigning the participant roles, as discussed in greater detail infra. Once the collaboration session has been established, the collaboration component 122 can further employ the context management server 130 to manage light-weight synchronization of context changes that occur in association with usage of the application by the participants during the collaboration session. The collaboration component 122 can further include data management component 124 to manage synchronization and exchange of application data between the participating clients during the collaboration session.

The context management server 130 can include any network server or virtual server, such as a file or web server. The context management server 130 can include session creation component 132 and context management component 134. The context management server 130 can include or be operatively coupled to processing circuitry (e.g., one or more processors or microprocessors), memory (e.g., RAM, ROM, and hybrid types of memory), and storage devices (e.g., hard drives, optical drives, and tape drives). The processing circuitry can execute computer-executable instructions defined by the session creation component 132 and the context management component 134 (which may be stored in memory coupled to the context management server 130). The application server 116 and the context management server 130 can be communicatively coupled directly and/or via the communications framework 114. The client devices (e.g., the initiating client device 102 and the one or more joining client device 108) can also be communicatively coupled to the context management server 130 via the communications framework 114.

In one or more embodiments, the session creation component 132 controls generating the collaboration session as facilitated by the collaboration component 122. This processed is described in greater detail below. In various embodiments, the participants of a collaboration session can be assigned a role as either an "initiating participant" or a "joining participant." In order to establish a collaboration session, a user/client device can send a collaboration session initiation request to the context management server 130. The session creation component 132 then creates the collaboration session and assigns the user/client device from which the collaboration session initiation request was received with the initiating participant role. The session creation component 132 then assigns all other participants that join the collaboration session with a joining participant role. In the embodiment shown, the initiating client device 102 corresponds to the initiating participant and the one or more joining client devices 108 correspond to clients/users that are joining participants. In some embodiments, the participants can change roles throughout the collaboration session from initiator to participant, and vice versa, by sending a request to change roles to the context management server 130. With these embodiments, the session creation component 132 can change the participant roles as authorized. As discussed below, the client device/user with the initiator participant role controls the content being presented to all participants throughout the collaboration session.

In various embodiments, the session creation component 132 can generate a collaboration session in response to reception of a collaboration session initiation request (hereinafter "initiation request") from one user/client device in association with access of the application by user/client device. In one or more embodiments, to establish a collaboration session, the initiating client device 102 can access the application server 116 and open a client session. For purposes of this example, Client 1 Session $120_1$ corresponds to the client session for the initiating client device 102. For example, assuming the application comprises a web-application that requires users to access the application using established user accounts, the user of the initiating client device 102 can access the application using the access application (e.g., a browser) and provide the requisite sign-in information (e.g., username and password). Upon successful login, the application server 116 can generate Client 1 Session and the user can begin using the features and functionalities of the application.

The collaboration component 122 can provide a collaboration functionality for the application that allows a user with an established client session to establish a collaboration session with other users. In various embodiments, the collaboration component 122 can allow the user to request a collaboration session in association with usage of the application. For example, in association with establishment of Client 1 Session $120_1$, the user of the initiating client device 102 can provide input requesting a collaboration session. In some embodiments, the input can identify one or more joining participants that the initiator authorizes and/or otherwise invites to join the collaboration session. For example, the input can identify the authorized joining participants by a known identifier for each participant (e.g., by username, by email address, by an identifier for their client device such as a device ID, device phone number, etc.). Additionally, or alternatively, the collaboration session can authorize any user or group of users to join the collaboration session.

The collaboration component 122 can further be configured to send the collaboration session initiation request to the context management server 130. In various embodiments, based on reception of the collaboration session initiation request, the session creation component 132 can generate a unique identifier (ID) for the collaboration session, referred to herein as the session ID. The session creation component 132 can further set up or otherwise create the collaboration session and assign the client device/user/client session from which the initiation request was received the role of "initiator." The session creation component 132 can further control and/or manage joining of the collaboration session by the joining participants using the session ID.

In some embodiments, once the session creation component 132 has created the collaboration session, generated the session ID and assigned the initiating client device/user the initiating participant role, the session creation component 132 can notify the collaboration component 122. In association with notifying the collaboration component 122, the session creation component 132 can provide the collaboration component 122 with collaboration session information. The collaboration session information can include the session ID and identify the initiating client device 102 (and/or the initiating user/client session) as having the initiator role. In some implementations, the collaboration session information can also identify the participants authorized/invited to join the collaboration session. For example, the collaboration session information can include information identifying the participants (e.g., by account name, username, email address, device identifier, etc.) and/or including information for electronically notifying the participants that they have been invited to join the collaboration session.

In various embodiments, the collaboration component 122 and/or the session creation component 132 can make the collaboration session created by the initiating client device 102 available to the invited client devices/users (e.g., named/identified) and/or to any authorized client device/ user through a collaboration session discovery function/ service. For example, the collaboration session discovery function/service can allow invited and/or authorized participants to access (e.g., in association with usage of one or more security access policies) collaboration session information identifying established collaboration sessions (e.g., via a query function, via a posted list of available collaboration sessions, etc.) that are available for joining. The joining participants can further select the collaboration session they would like to join to provide a join request to the session creation component 132. For example, using their respective joining client devices 108, the invited participants can send a join request to the context management server 130 comprising the session ID and requesting to join the collaboration session.

Additionally, or alternatively, the collaboration component 122 and/or the session creation component 132 can notify the participants that they have been invited to join the collaboration session. The notification can include the session ID and/or otherwise include access information for joining the collaboration session. For example, in one implementation, the collaboration component 122 and/or the session creation component 132 can provide the invited participants with an email notification comprising the session ID and/or otherwise comprising a link to join the collaboration session. In another example, the collaboration component 122 and/or the session creation component 132 can post the notification to respective user accounts for invited participants established with the application server 116. The invited participants can further join the collaboration session based on reception of the session ID and/or the access information for joining the collaboration session. For example, using their respective joining client devices 108, the invited participants can send a join request to the context management server 130 comprising the session ID and requesting to join the collaboration session.

In some embodiments, the joining participants can send the join request to the context management server via the application server 116. For example, an invited joining participant can access the application server 116 using a joining client device 108 and open a new client session (e.g., Client 2 session 120₂). The joining participant can further generate and send the join request through the new client session and the collaboration component 122. With these embodiments, the application server 116 can forward the join request to the context management server 130. The join request can include the session ID and information identifying the participating user, client device, and/or client session. Additionally, or alternatively, the invited participants can send the join request directly to the context management server 130.

Based on reception of a join request from an invited participant, the session creation component 132 can further add the invited participant to the collaboration session and assign them a "joining participant" role. In this regard, the session creation component 132 can update the collaboration session information to identify the joined participant as being actively joined to the collaboration session. Once added, the session creation component 132 can inform the collaboration component 122 that the invited participant has joined the collaboration session. This process can be repeated for any number of joining participants.

Based on generating the collaboration session, the session creation component 132 directs the application server 116 to manage synchronization and exchange of application data between the participating client devices (e.g., initiation client device 102 and one or more joining client devices 108) during the collaboration session using data management component 124. The context management server 130 further employs the context management component 134 to control synchronization of context changes that occur in association with simultaneous usage of the application during the collaboration session.

In this regard, the data management component 124 ensures the same application data is loaded for viewing by all participants of the collaboration session over the course of the collaboration session. In other words, the data management component 124 ensures the application data being displayed by the initiating client device 102 and the joining client devices 108 is the same throughout the collaboration session. To facilitate this end, the data management component 124 synchronizes the application data across all participants such that the application data being viewed by the joining participants is the same as that of the initiator participant.

In accordance with an in-app collaboration session, the data management component 124 determines the current application data being accessed and viewed by initiating participant or the initiating client device 102 (e.g., client 1 app data). The data management component 124 further provides the current application data to the joining participants at their joining client devices 108. For example, assume the application defined by application logic 118 is a medical imaging application that provides for viewing and interacting with medical image data and the users of the initiating client device 102 and the joining client devices 108 have established a collaboration session within the application to simultaneously view and discuss the same medical image studies for a patient. At the beginning of the collaboration session, the initiating client device 102 loads a first study for a patient using the medical imaging application, resulting in a first image in the study being rendered on the display 106. In accordance with this example, the data management component 124 can determine/monitor the content being accessed, loaded and displayed at the initiating client device 106, which in this case includes loading of the first study and display of the first image. The data management component 124 can further provide the joining client devices with 108 with the first study for loading and direct the first client devices to display the first image 108.

The data management component 124 can further continuously monitor the application data being accessed and viewed by the initiating client device 102 over the course of the collaboration session to determine when new application data is being accessed and viewed by the initiating client device 102. For example, in association with the example collaboration session described above involving the medical imaging application, the data management component 124 can determine when the initiating client device 102 accesses and loads a second study for the patient for review. Based on accessing and loading new content at the initiating client device, the data management component 124 can further provide the new content to the initiating participant devices 108. In another example, the data management component 123 can determine when the initiating client device 102 scrolls from displaying the first image in the study to displaying the second image in the study. The data management component 124 can further direct the participating client devices 108 to display the second image in the study during the collaboration session so that the same content is being viewed by all participants.

In some embodiments, the application server 116 can store the application data being accessed and/or viewed by the initiating client device 102 (e.g., Client 1 App Data) during the collaboration session in the server data store 126. The data management component 124 can further provide this application data to the joining client device as pulled from the server data store 126. In this regard, the data management component 124 manages the distribution or exchange of the application data from the server data store 126 to the participating clients throughout the collaboration session. Additionally, or alternatively, the data management component 124 can further provide the client 1 app data to the joining client devices 108 as pulled from the one or more external data sources 128. In either of these embodiments, the data management component 124 distributes the same application data to the participating client devices without sharing the application data with the context management server 130.

The application server 116 further offloads managing the synchronization of the collaboration context related to the simultaneous usage of the application by the participants throughout the collaboration session to the context management component 134. Information regarding the collaboration context is referred to herein as usage context information. In various embodiments, the usage context information can include information describing and/or identifying the current application data being displayed by the initiating client device 102, such as metadata associated with the current application data being displayed. For example, as applied to medical image data displayed at the initiating client device 102, the usage context informaiton can identify the current image being displayed (e.g., a unique identifier or name for the image file), the patient represented in the image data, the study associated with the image data, and various other attributes associated with the image data.

The usage context information can also include information identifying user actions performed in association with usage of the application during the collaboration session. For example, the user actions can include (but are not limited to), movement of a cursor (or mouse or the like) about the user interface displaying the application data, selection of interactive icons, scrolling, editing displayed application data, changing the view/perspective of the displayed application data, changing the application data being displayed (e.g., moving from a first image to a second image), applying a function or task, adding annotations and/or mark-ups to the displayed application data (e.g., in the form of text, symbols, marks, etc.), manipulating an image, removing annotations from an images, providing text input, selecting an application function, and so on The usage context information can also include events that occur in response to user interaction with the features and functionalities of the application during the collaboration session. Such events can include but are not limited to, events that result in changing the current application data being displayed, events that result in changing a perspective or view of the current application data being displayed, and events that result in editing or modifying the current application data being displayed.

In some embodiments, only the initiating client device 102 can perform actions throughout the collaboration session that result in context changes. For example, only the initiating participant at the initiating client device 102 can change the application data being viewed, manipulate the application data, execute application functions, and so on during the collaboration session. With these embodiments, the context management component 134 can monitor the context changes and user actions performed by the initiating participant at the initiating client device 102 only. The context management component 134 can further notify the joining participating client devices regarding the context changes in real-time (or substantially real-time) by providing them with usage context information identifying and/or describing the context changes and events. The participating client devices 108 can further apply the context changes accordingly.

For example, continuing with the above-described medical imaging collaboration session example, assume the initiating user of the initiating client device 102 performs a scroll action in association with display of a series of images. The context management component 134 can monitor the actions performed at the initiating client device 102 to determine that a scroll event has occurred. The context management component 134 can then notify the joining client devices 108 that the scroll event occurred. The notification can include information indicating the direction, degree, and timing of the scroll event. Additionally, or alternatively, the context management component 134 can notify the application server 116 for the joining participating client devices regarding the context changes in real-time (or substantially real-time) and the application server 116 can adapt the application data being displayed at the participating client devices (e.g., via their respective user session) accordingly.

In other embodiments, both users of the initiating client device 102 and the joining client devices 108 can both perform actions throughout the collaboration session that result in collaboration context changes. With these embodiments, the context management component 134 can monitor the context changes and user actions performed by the initiating participant at the initiating client device 102 and the user actions performed by the joining participants of the joining client devices 108. The context management component 134 can further notify the joining participating client devices 108 regarding the context changes that occur at the initiating client device 102 in real-time (or substantially real-time) by providing them with usage context information identifying and/or describing the context changes and events. The participating client devices 108 can further apply the context changes accordingly. In addition, based on a user action/context change that occurs at a joining client device 108, the context management component 134 can notify the initiating client device 102 (and other joining participant client devices) regarding the user action/context change in real-time (or substantially real-time) by providing them with usage context information identifying and/or describing the context changes and events.

Figure 2:
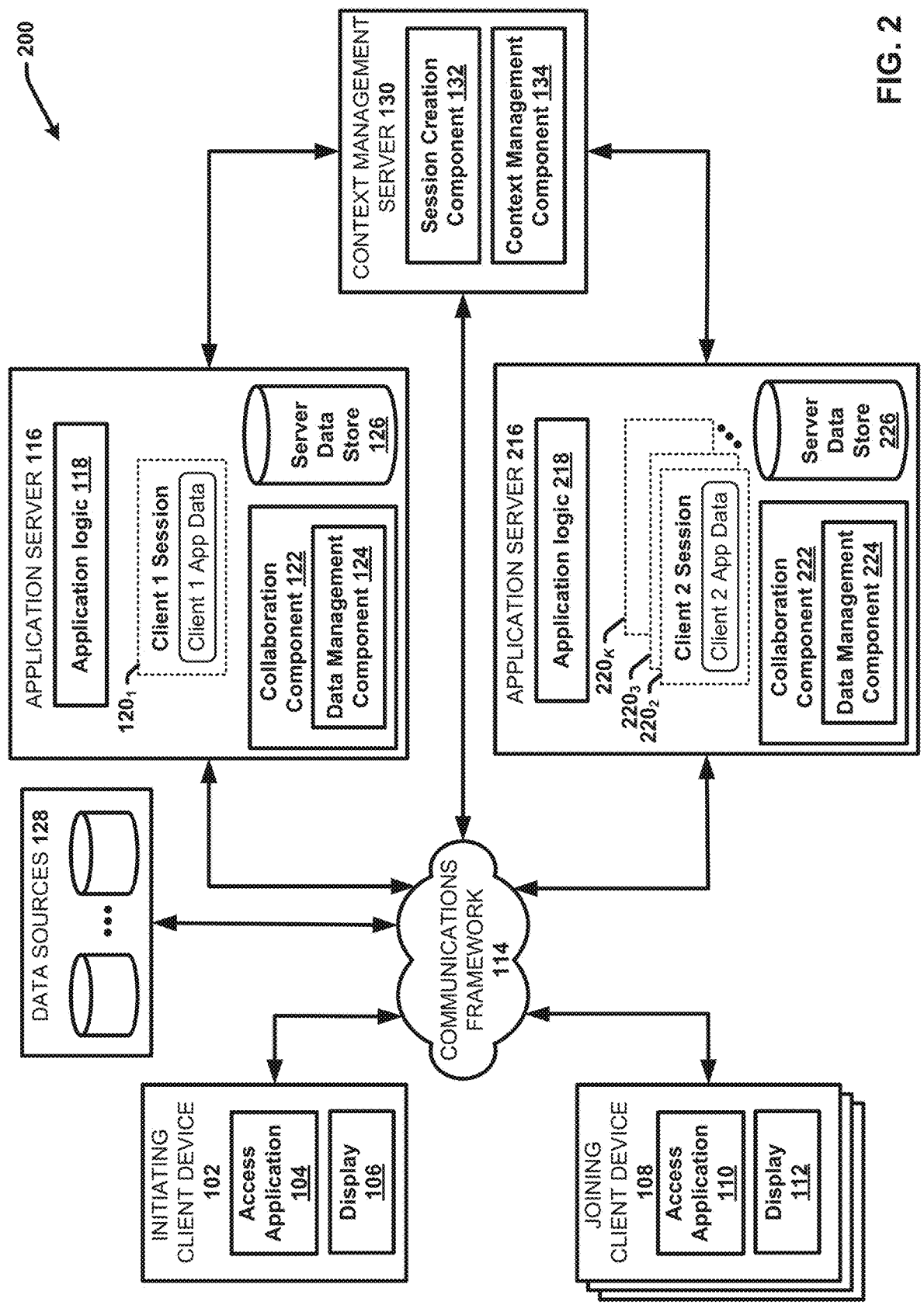
FIG. 2 illustrates a block diagram of another example, non-limiting system that facilitates improving the efficiency of collaboration session synchronization in accordance with one or more embodiments of the disclosed subject matter.

FIG. 2 illustrates a block diagram of an example, non-limiting system 200 that facilitates improving the efficiency of collaboration session in accordance with one or more embodiments of the disclosed subject matter. System 200 supports collaboration sessions between multiple clients using different instances of the same application served by different application servers (in-app collaboration) as well as collaboration session between multiple clients using different applications served by different application servers (cross-app collaboration). Repetitive description of like elements is omitted for sake of brevity.

System 200 is similar to system 100 with the addition of a second application server, application server 216. In some embodiments, application server 216 can correspond another instance of application server 116. For example, both application server 116 and application server 216 can serve the same application in a scaled-up architecture that uses multiple server instances in order to serve an increasing number of clients. With these embodiments, the application logic 118 and the application logic 218 can be the same and represent the same application. With these embodiments, the collaboration session can be considered an in-app collaboration session and both the initiating client device 102 and the one or more joining client devices 108 are using the same application yet connected to different server instances. In accordance with these embodiments, the number of server instances can include more than two, despite only two being shown in system 200.

In other embodiments, the application servers can provide different applications and system 200 can provide for cross-app collaboration sessions. With these embodiments, the application logic 218 can define a different application relative to application logic 118. For example, the applications can comprise different types of applications that provide different features and functionalities across different form factors yet capable of displaying/consuming at least some of the same application data. For instance, one application may provide for merely displaying the application data while another may provide additional functions using the application data. For example, the first application (e.g., defined by application logic 118) may comprise a medical imaging application that allows users to view medical image data and create diagnostic reports, and the second application (e.g., defined by application logic) may comprise a medical imaging application that provides for viewing the medical image data, annotating the medical image data, and running workflows (e.g., involving one or more AI models/algorithms) on the medical image data.

In accordance with the cross-app collaboration embodiments, aside from the application logic 218, the application server 216 can comprise same or similar features and functionalities as application server 116. In this regard, the collaboration component 232 can be or correspond to a different instance of the collaboration component 122, the data management component 224 can be or correspond to a different instance of the data management component 124 and the server data store 226 can be or correspond to a local data store used by the application serve 216 to store application data and other data. Repetitive description of these components is omitted for sake of brevity.

In this regard, system 200 provides for establishing and managing a collaboration session between two or more users/client device simultaneously accessing and using the same application or different applications served by two or more different application servers. For example, system 200 provides for establishing and managing a collaboration session between at least one first user/client device accessing application server 116 and using the application defined by application logic 118 and at least one second user/client device accessing application server 216 and using the application defined by application logic 218. In this regard, system 200 can facilitate joining at least one first client session established with application server 116 (e.g., Client 1 Session $120_1$), with one or more second client sessions established with application server 216 (e.g., client sessions $220_{2-K}$).

System 200 is described with reference to Client 1 Session $120_1$ corresponding to the usage session of the initiating client device 102 with application server 116 and client sessions $220_{2-K}$ corresponding to the usage sessions of the joining client devices 108 with application server 216. However, it should be appreciated that this implementation is merely exemplary. For example, one or more of the joining client sessions can be with application server 116, and/or the initiating client session can be with application server 216. In addition, although system 100 depicts two application servers, system 200 can be implemented with any number of different application servers (e.g., three application servers, four application servers, and so on) including an instance of the collaboration component 122 that are connected to the context management server 130 and/or the communication framework 114. Further, any of the application servers can serve the initiating client device 102 and the one or more joining client devices 108.

In this regard, similar to system 100, system 200 divides data synchronization management and context synchronization management responsibilities. In this regard, the context management server 130 communicates with both application servers to facilitate generating the collaboration session and further handles context synchronization management during the collaboration session in a same or similar manner as described with reference to system 100. However, the application server that serves the initiating client device assumes the responsibility of managing data exchange and synchronization between the collaboration session participants using the collaboration component. For example, in an implementation in which application server 116 serves the initiating client device 102 and application server 216 serves at least one joining client device 108, the application server 116 will handle data synchronization management between the initiating client device 102 and the at least one joining client device 108 during the collaboration session using collaboration component 122. Likewise, in another implementation in which application server 216 serves the initiating client device 102 and application server 116 serves at least one joining client device 108, the application server 216 will handle data synchronization management between the initiating client device 102 and the at least one joining client device 108 during the collaboration session using collaboration component 222. In both of these implementations, neither application servers share the application data consumed during the collaboration session with the context management server 130.

To facilitate this end, the application servers (e.g., application server 116, application server 216, and optionally additional application servers) can be communicatively coupled via the communication framework 114 and expose a well-defined interface to one another for exchanging application data during the collaboration session. In particular, the data management components (e.g., data management component 124 and data management component 224) can respectively be configured to employ collaboration data exchange protocol via which they exchange application data during the collaboration session according to which application server serves the initiating client device 102.

In some embodiments, the collaboration data exchange protocol directs the application server serving the initiating client device 102 (e.g., application server 116) to expose the current application data being viewed/consumed by the initiating client device 102 during the collaboration session as stored in its server data store (e.g., server data store 126). The collaboration data exchange protocol can further direct and authorize the application server serving a joining client device 108 to extract the application data from the server data store and provide it to the joining client device 108. In some implementations of these embodiments, the data management component of the initiating client device 102 can identify the current application data being used/viewed by the joining client device and inform the data management component of the joining client device 108 accordingly. For example, the data management component of the initiating client device 102 (e.g., data management component 124) can notify the data management component of the joining client device 108 (e.g., data management component 224) regarding the current application data being used/viewed by the initiating client device 102. The notification can identify the current application data and provide instructions regarding how to locate and extract the current application data from the server data store of the initiating client device 102. The data management component of the joining client device 108 can further use this information to retrieve the current application data from the server data store. The data management component of the joining client device 108 can further be configured to regularly or continuously extract new application data from the server data store of the initiating client device 102 as the new application data is used/viewed by the initiating client device 102 during the collaboration session. The data management component of the joining client device can further provide the extracted application data to the joining client device 108 for rending at the same time as the initiating client device 102.

In another embodiment, the collaboration data exchange protocol can direct the application server serving the initiating client device 102 (e.g., application server 116) to push the current application data being viewed/consumed by the initiating client device 102 during the collaboration session as stored in its server data store (e.g., server data store 126) to application server of the joining client device 108. The data management component of the initiating client device 102 can further be configured to regularly or continuously push new application data from its server data store of the application server of the participating client device 108 as the new application data is used/viewed by the initiating client device 102 during the collaboration session. The data management component of the joining client device can further provide the received application data to the joining client device for rending at the same time as the initiating client device.

The processes for creating a collaboration session in association with usage of a same or different application served by two or more application servers (e.g., application server 116 and application server 216) can proceed in a similar manner as that of an in-app collaboration session served by a single application server (e.g., as described with reference to FIG. 1). In various embodiments, the session creation component 132 can generate such a collaboration session in response to reception of an initiation request from one user/client device in association with access of the application by user/client device. For example, in an implementation in which the initiating client device 102 is using application logic 118 and application server 116, the initiating client device 102 can access the application server 116 and open a client session. For purposes of this example, Client 1 Session $120_1$ corresponds to the client session for the initiating client device 102. For instance, assuming the application comprises a web-application that requires users to access the application using established user accounts, the user of the initiating client device 102 can access the application using the access application (e.g., a browser) and provide the requisite sign-in information (e.g., username and password). Upon successful login, the application server 116 can generate Client 1 Session $120_1$ and the user can begin using the features and functionalities of the application defined by application logic 118.

The collaboration component 122 can further allow the user to request a collaboration session in association with usage of the application. For example, in association with establishment of Client 1 Session $120_1$, the user of the initiating client device 102 can provide input requesting a collaboration session. In some embodiments, the input can identify one or more joining participants that the initiator authorizes and/or otherwise invites to join the collaboration session. For example, the input can identify the authorized joining participants by a known identifier for each participant (e.g., by username, by email address, by an identifier for their client device such as a device ID, device phone number, etc.). In addition, in some embodiments in which the application being used by the joining participants is a different application, the input can identify or indicate the different application. For example, assuming the joining participants are using and/or will be using application server 216 and application logic, the input can include this information. Additionally, or alternatively, the collaboration session can authorize any user or group of users to join the collaboration session.

The collaboration component 122 can further be configured to send the collaboration session initiation request to the context management server 130. In various embodiments, based on reception of the collaboration session initiation request, the session creation component 132 can generate the session ID for the collaboration session. The session creation component 132 can further set up or otherwise create the collaboration session and assign the client device/user/client session from which the initiation request was received the role of "initiator," which in this example is initiating client device 102. The session creation component 132 can further control and/or manage joining of the collaboration session by the joining participants using the session ID.

In some embodiments, once the session creation component 132 has created the collaboration session, generated the session ID and assigned the initiating client device/user the initiating participant role, the session creation component 132 can notify the collaboration component 122 of the initiator. In association with notifying the collaboration component 122, the session creation component 132 can provide the collaboration component 122 with collaboration session information. The collaboration session information can include the session ID and identify the initiating client device 102 (and/or the initiating user/client session) as having the initiator role. In some embodiments, the collaboration session information can also identify the participants authorized/invited to join the collaboration session and the application/application server they will be using. For example, the collaboration session information can include information identifying the participants (e.g., by account name, username, email address, device identifier, etc.), information identifying the application/application server being used be the joining participants, and/or including information for electronically notifying the participants that they have been invited to join the collaboration session.

In some implementations of these embodiments, the collaboration component 122 can further broadcast or otherwise provide the collaboration session information to the application server of the joining client devices 108, which in this example is application server 216. The collaboration component 222 can further notify the joining participants that they have been invited to join the collaboration session. The notification can include the session ID and/or otherwise include access information for joining the collaboration session. For example, in one implementation, the collaboration component 222 can provide the invited participants with an email notification comprising the session ID and/or otherwise comprising a link to join the collaboration session. In another example, the collaboration component 222 can post the notification to respective user accounts for invited participants established with the application server 216. Additionally, or alternatively, the session creation component 132 can notify the invited participants that they have been invited to join the collaboration session. For example, the session creation component 132 can send an electronic notification (e.g., an email, a text message, a push notification, etc.) notifying the invited participants that they have been invited to join the collaboration session, wherein the notification includes session ID and/or otherwise include access information for joining the collaboration session.

The invited participants can further join the collaboration session based on reception of the session ID and/or the access information for joining the collaboration session. For example, using their respective joining client devices 108, the invited participants can send a join request to the context management server 130 comprising the session ID and requesting to join the collaboration session. In some embodiments, the joining participants can send the join request to the context management server via the application server 216. For example, an invited joining participant can access the application server 216 using a joining client device 108 and open a new client session (e.g., Client 2 session 220$_2$). The joining participant can further generate and send the join request through the new client session and the collaboration component 222. With these embodiments, the application server 216 can forward the join request to the context management server 130. The join request can include the session ID and information identifying the participating user, client device, and/or client session. Additionally, or alternatively, the invited participants can send the join request directly to the context management serve 130.

Additionally, or alternatively, the collaboration component 122 and/or the session creation component 132 can make the collaboration session created by the initiating client device 102 available to the invited client devices/users (e.g., named/identified) and/or to any authorized client device/user through a collaboration session discovery function/service. For example, the collaboration session discovery function/service can allow invited and/or authorized participants to access (e.g., in association with usage of one or more security access policies) collaboration session information identifying established collaboration sessions (e.g., via a query function, via a posted list of available collaboration sessions, etc.) that are available for joining. The joining participants can further select the collaboration session they would like to join to provide a join request to the session creation component 132. For example, using their respective joining client devices 108, the invited participants can send a join request to the context management server 130 comprising the session ID and requesting to join the collaboration session.

Based on reception of a join request from an invited participant, the session creation component 132 can further add the invited participant to the collaboration session and assign them a "joining participant" role. In this regard, the session creation component 132 can update the collaboration session information to identify the joined participant as being actively joined to the collaboration session. Once added, the session creation component 132 can inform the collaboration component 122 and/or collaboration component 222 that the invited participant has joined the collaboration session. This process can be repeated for any number of joining participants.

Based on generating the collaboration session and the application server 116 serving the initiating client device 102, the session creation component 132 directs the application server 116 to manage synchronization and exchange of application data between the participating client devices (e.g., initiation client device 102 and one or more joining client devices 108) during the collaboration session using data management component 124. Additionally, or alternatively, based on generating the collaboration session and the application server 116 serving the initiating client device 102, the session creation component 132 can directs the application server 216 to communicate with the application server 116 to extract or receive application data used by the initiating client device during the collaboration session in accordance with the collaboration session protocol. The context management server further manages synchronization and exchange of application data between the participating client devices (e.g., initiation client device 102 and one or more joining client devices 108) during the collaboration session using data management component 124. The context management server 130 further employs the context management component 134 to control synchronization of context changes that occur in association with simultaneous usage of the application during the collaboration session.

For example, in accordance with a collaboration session wherein application server 116 serves the initiating client device 102 and application server 216 serves the joining client devices 108, the data management component 124 can determine the current application data being accessed and viewed by initiating participant or the initiating client device 102 (e.g., client 1 app data). The data management component 124 can further provide the current application data the application server 216 which in turn can provide the current application data to the joining participants at their joining client devices 108.

The application servers (e.g., application server 116 and application server 216) further offload managing the synchronization of the collaboration context related to the simultaneous usage of the different application by the participants throughout the collaboration session to the context management component 134. In some embodiments, only the initiating client device 102 can perform actions throughout the collaboration session that result in context changes. For example, only the initiating participant at the initiating client device 102 can change the application data being viewed, manipulate the application data, execute application functions, and so on during the collaboration session. With these embodiments, the context management component 134 can monitor the context changes and user actions performed by the initiating participant at the initiating client device 102 only. The context management component 134 can further notify the joining participating client devices regarding the context changes in real-time (or substantially real-time) by providing them with usage context information identifying and/or describing the context changes and events. The participating client devices 108 can further apply the context changes accordingly. In some implementations of these embodiments, the context management component 134 can notify the joining participating client devices regarding the context changes directly via communication framework 114. In other implementations of these embodiments, the context management component 134 can notify the application server (e.g., application server 216) of the joining participating client devices regarding the context changes. The application server of the joining client devices 108 can further notify the joining client devices regarding the context changes.

In other embodiments, both users of the initiating client device 102 and the joining client devices 108 can perform actions throughout the collaboration session that result in collaboration context changes. With these embodiments, the context management component 134 can monitor the context changes and user actions performed by the initiating participant at the initiating client device 102 and the user actions performed by the joining participants of the joining client devices 108. The context management component 134 can further notify the joining participating client devices 108 regarding the context changes that occur at the initiating client device 102 in real-time (or substantially real-time) by providing them with usage context information identifying and/or describing the context changes and events via their respective application servers. The joining client devices 108 can further apply the context changes accordingly. In addition, based on a user action/context change that occurs at a joining client device 108, the context management component 134 can notify the initiating client device 102 (and other joining participant client devices) regarding the user action/context change in real-time (or substantially real-time) by providing them with usage context information identifying and/or describing the context changes and events via their respective application servers.

Figure 3A:
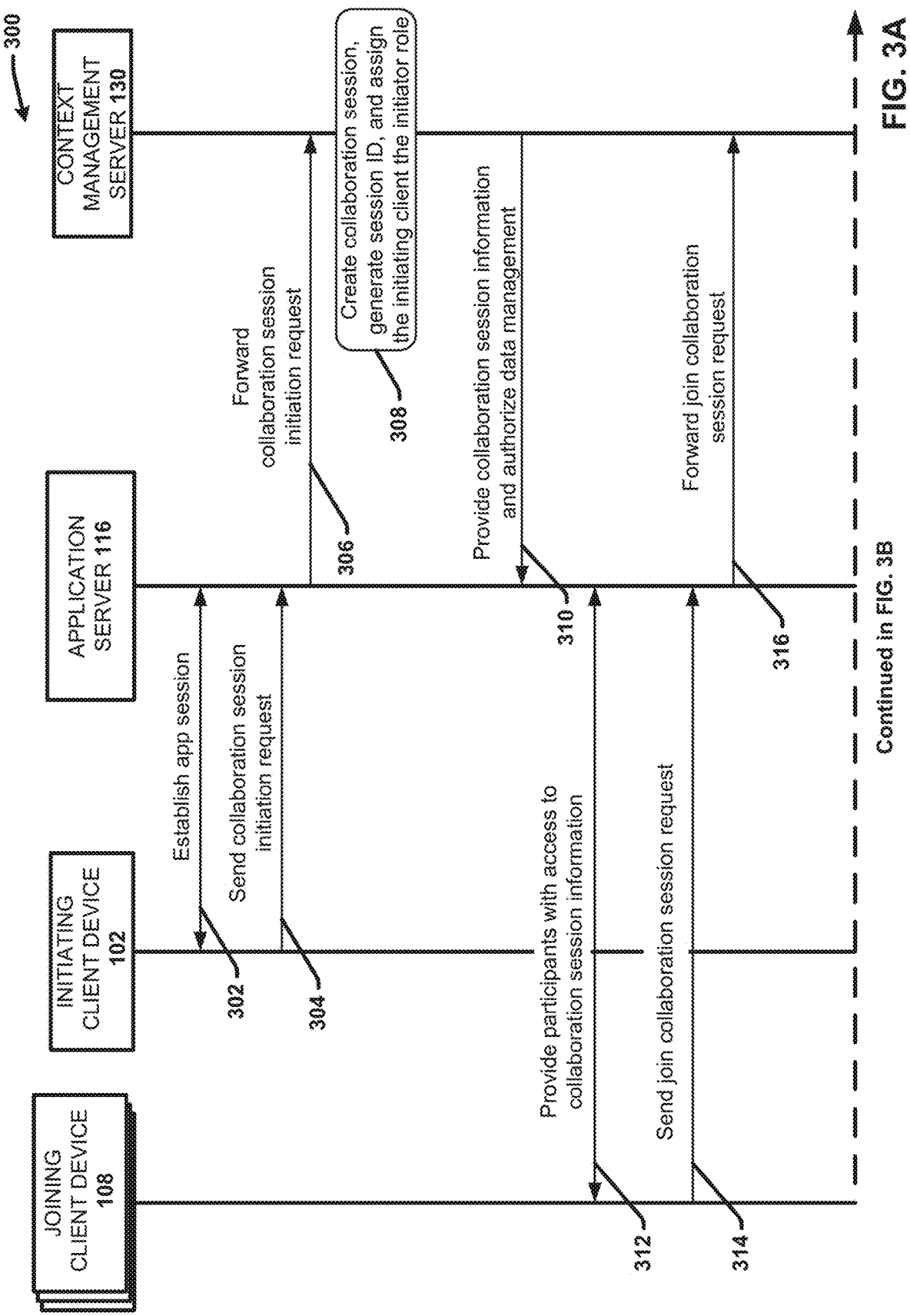
FIGS. 3A-3B provide a signaling diagram of an example process for performing a collaboration session between multiple clients using a same application server in accordance with one or more embodiments of the disclosed subject matter.
Figure 3B:
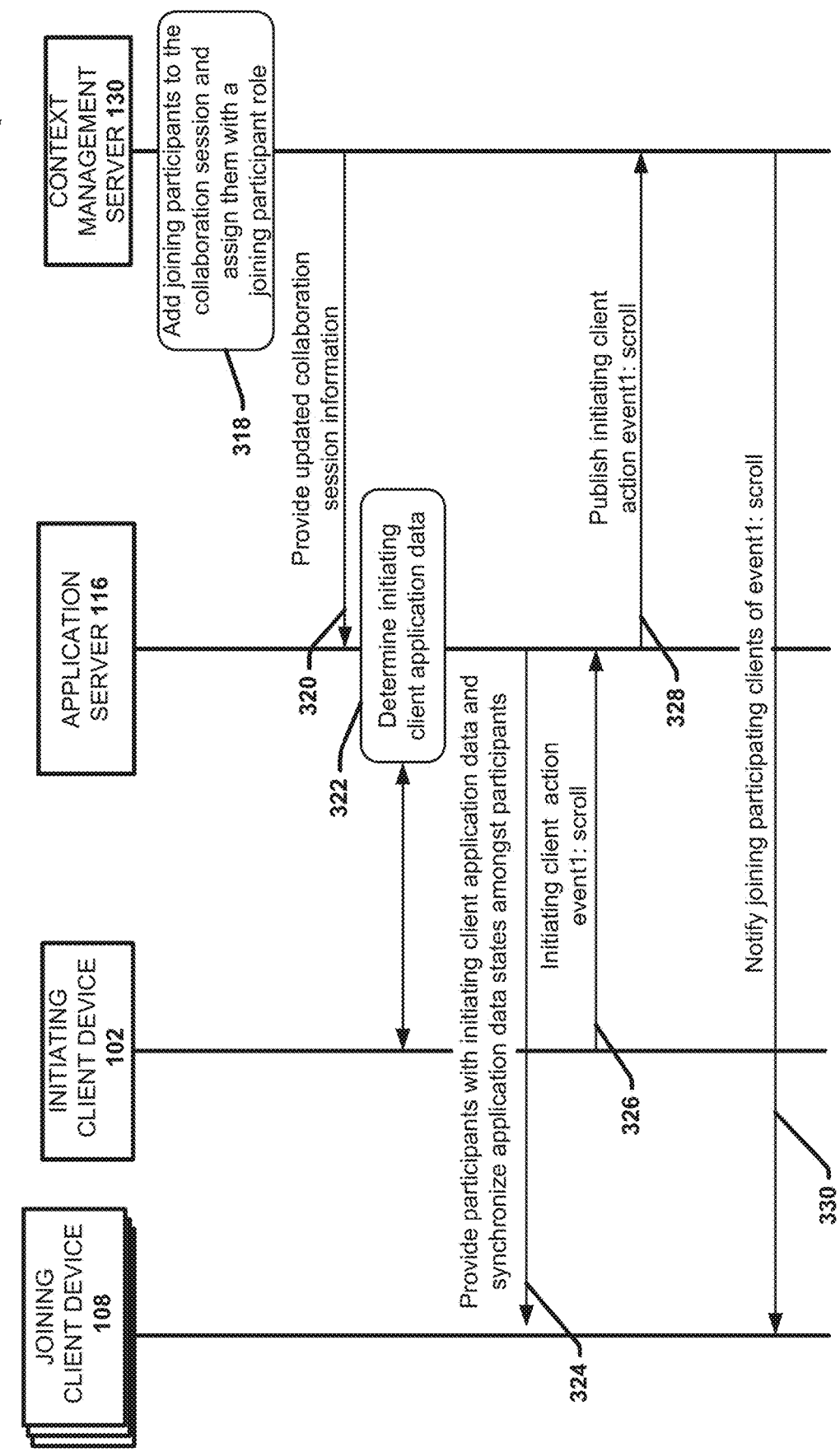

FIGS. 3A-3B provide a signaling diagram of an example process 300 for performing a collaboration session between multiple clients using a same application server (in-app collaboration) in accordance with one or more embodiments of the disclosed subject matter. Repetitive description of like elements employed in respectively. Process 300 provide an example embodiment supported by system 100.

With reference to FIGS. 1 and 3A, at 302, the initiating client device 102 can establish an application session with application server 116 (e.g., Client 1 Session $120_1$) using application logic 118. At 304, the initiating client device 108 can send a collaboration session initiation request to the application sever 116 as supported by collaboration component 122. At 306, the application server 116 can forward the collaboration session initiation request to the context management server 130. At 308, the context management server 130 can create the collaboration session, generate the session ID and assign the initiating client (e.g., initiating client device 102 and Client 1 Session $120_1$) the initiator role. At 310, the context management server 130 can provide the application server 116 with the session information and authorize data management by the application server 116 during the collaboration session.

At 312, the application server 116 (or alternatively the context management server 130) can provide the one or more joining client devices 108 (and/or users of the joining client devices) with access to the collaboration session information. For example, the application server 116 (or alternatively the context management server 130) can post the collaboration session information to an accessible collaboration session forum/discovery space via which the joining clients can access (e.g., under defined security and access policies) and query to determine which session they are interested in joining. In some implementations, the application server 116 can also notify (e.g., via an email notification, a text message notification, a push notification, etc.) the invited participants that they have been invited to join the established collaboration session. The notification can include the collaboration session ID and/or a link to access the collaboration information to facilitate providing a join request. At 314, the joining client devices 108 can send a join collaboration session request to the application server 116. The join collaboration request can include the session ID. At 316, the application server 116 can forward the join collaboration session request to the context management server 130.

Continuing with reference to FIGS. 1 and 3B, at 318 the context management server 130 can add the joining participants to the collaboration session and assign them with a joining participant role. At 320, the context management server 130 can provide the application server 116 with updated collaboration session information including the added joining clients. At 322, the application server 116 can determine the current application data being used/viewed by the initiating client device 102. At 324, the application server can provide the initiating client application data to the joining client devices and synchronize application data states amongst the participants. At 326, the initiating client performs a scroll action, referenced as action event 1: scroll. At 328, the application server 116 publishes the initiating client action event 1: scroll to the context management server 130. At 330, the context management server 130 notifies the joining participants of the initiating client action event 1: scroll.

Figure 4A:
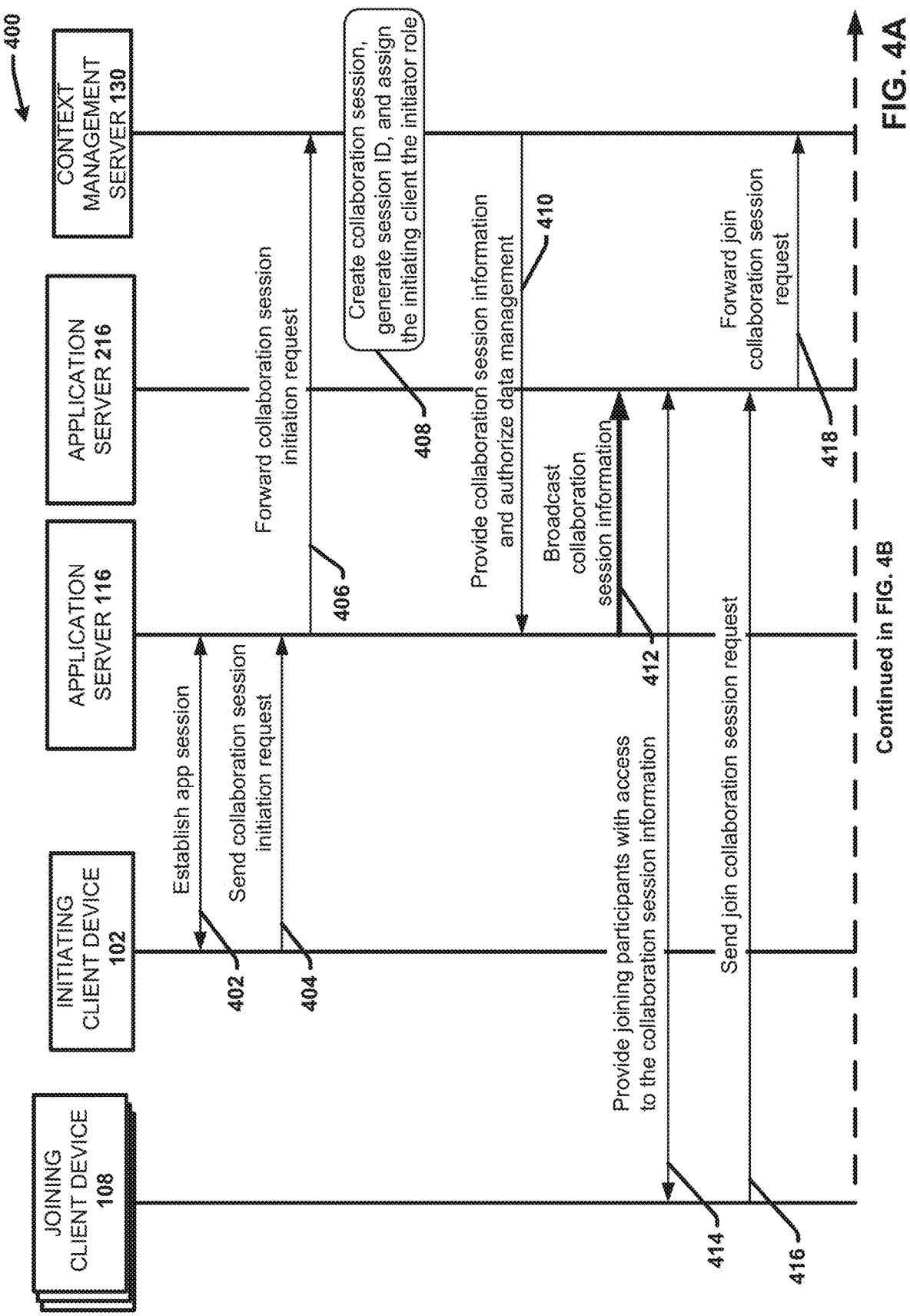
FIGS. 4A-4B provide a signaling diagram of an example process for performing a collaboration session between multiple clients using different application servers in accordance with one or more embodiments of the disclosed subject matter.
Figure 4B:
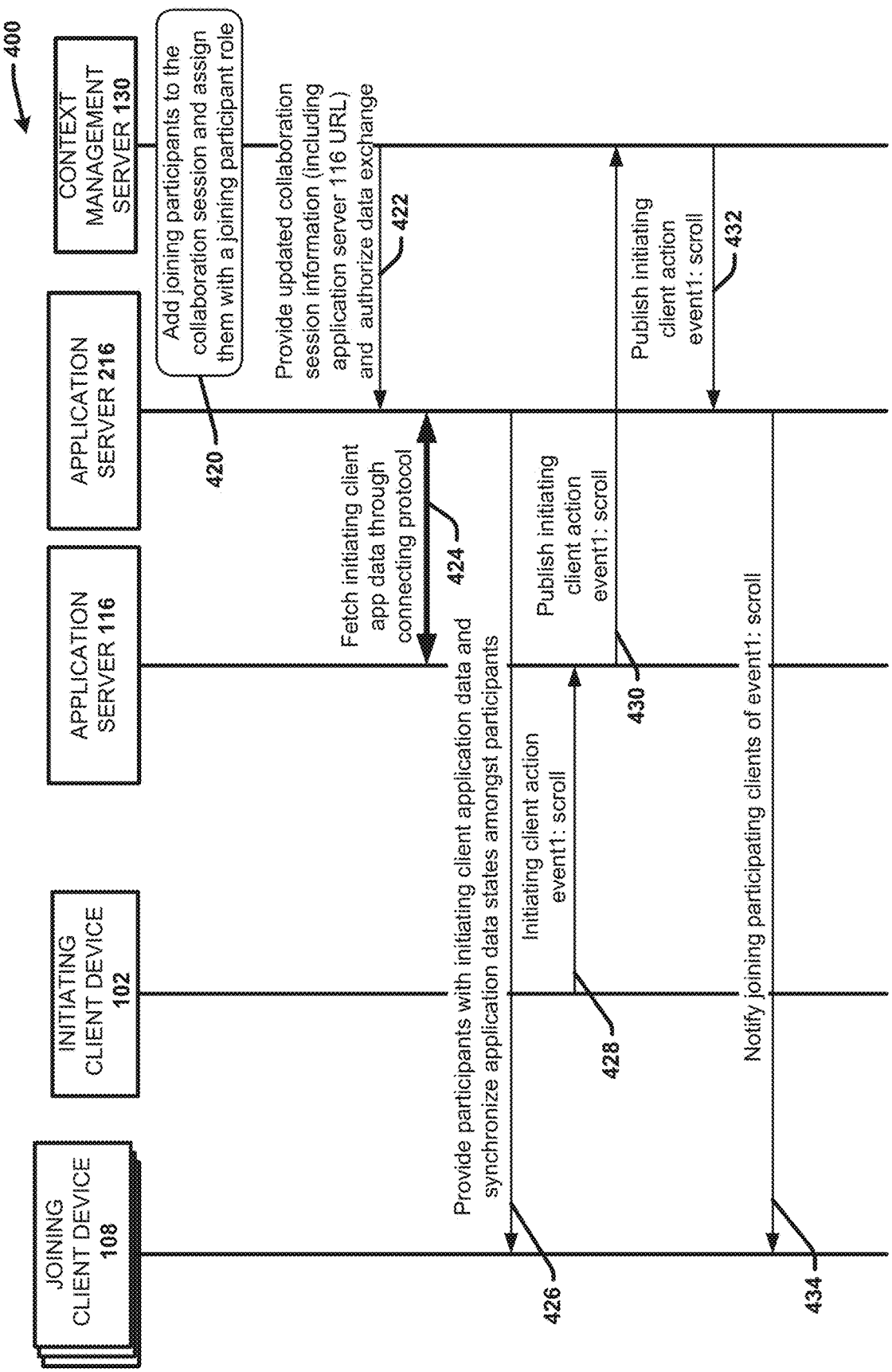

FIGS. 4A-4B provide a signaling diagram of an example process 400 for performing a collaboration session between multiple clients using different application servers in accordance with one or more embodiments of the disclosed subject matter. Process 400 provide an example embodiment supported by system 200.

With reference to FIGS. 2 and 4A, at 402, the initiating client device 102 can establish an application session with application server 116 (e.g., Client 1 Session $120_1$) using application logic 118. At 404, the initiating client device 108 can send a collaboration session initiation request to the application server 116 as supported by collaboration component 122. At 406, the application server 116 can forward the collaboration session initiation request to the context management server 130. At 408, the context management server 130 can create the collaboration session, generate the session ID and assign the initiating client (e.g., initiating client device 102 and Client 1 Session $120_1$) the initiator role. At 410, the context management server 130 can provide the application server 116 with the session information and authorize data management by the application server 116 during the collaboration session.

At 412, the application server 116 can broadcast the collaboration session information to the application server 216 of the joining client devices 108. At 414, based on reception of the broadcasted session information, the application server 216 provide the one or more joining client devices 108 (and/or users of the joining client devices) with access to the collaboration session information. For example, the application server 216 (or alternatively the context management server 130) can post the collaboration session information to an accessible collaboration session forum/discovery space via which the joining clients can access (e.g., under defined security and access policies) and query to determine which session they are interested in joining. In some implementations, the application server 216 can also notify (e.g., via an email notification, a text message notification, a push notification, etc.) the invited participants that they have been invited to join the established collaboration session. The notification can include the collaboration session ID and/or a link to access the collaboration information to facilitate providing a join request. At 416, the joining client devices 108 can send a join collaboration session request to the application server 216. The join collaboration request can include the session ID. At 418, the application server 216 can forward the join collaboration session request to the context management server 130.

Continuing with reference to FIGS. 1 and 4B, at 420 the context management server 130 can add the joining participants to the collaboration session and assign them with a joining participant role. At 422, the context management server 130 can provide the application server 216 with updated collaboration session information and authorize data exchange between application server 216 and application server 116 during the collaboration session. The context management component 130 can also provide the application server 216 with the uniform resource locator (URL) for the application server 116 of the initiating client device 102 to enable the application server 216 to access and receive the application data of the initiating client device 102.

At 424, the application server 216 can fetch the initiation client application data through the connecting protocol. At 426 the application server 216 can provide the initiating client application data to the joining client devices 108 and synchronize application data states amongst the participants. At 428, the initiating client performs a scroll action, referenced as action event 1: scroll. At 430, the application server 116 publishes the initiating client action event 1: scroll to the context management server 130. At 432, the context management server 130 publishes the initiating client action event 1: scroll to the application server 216 of the joining client devices 108, and at 434, the application server 216 notifies the joining client devices 108 of the initiating client action event 1: scroll.

Figure 5:
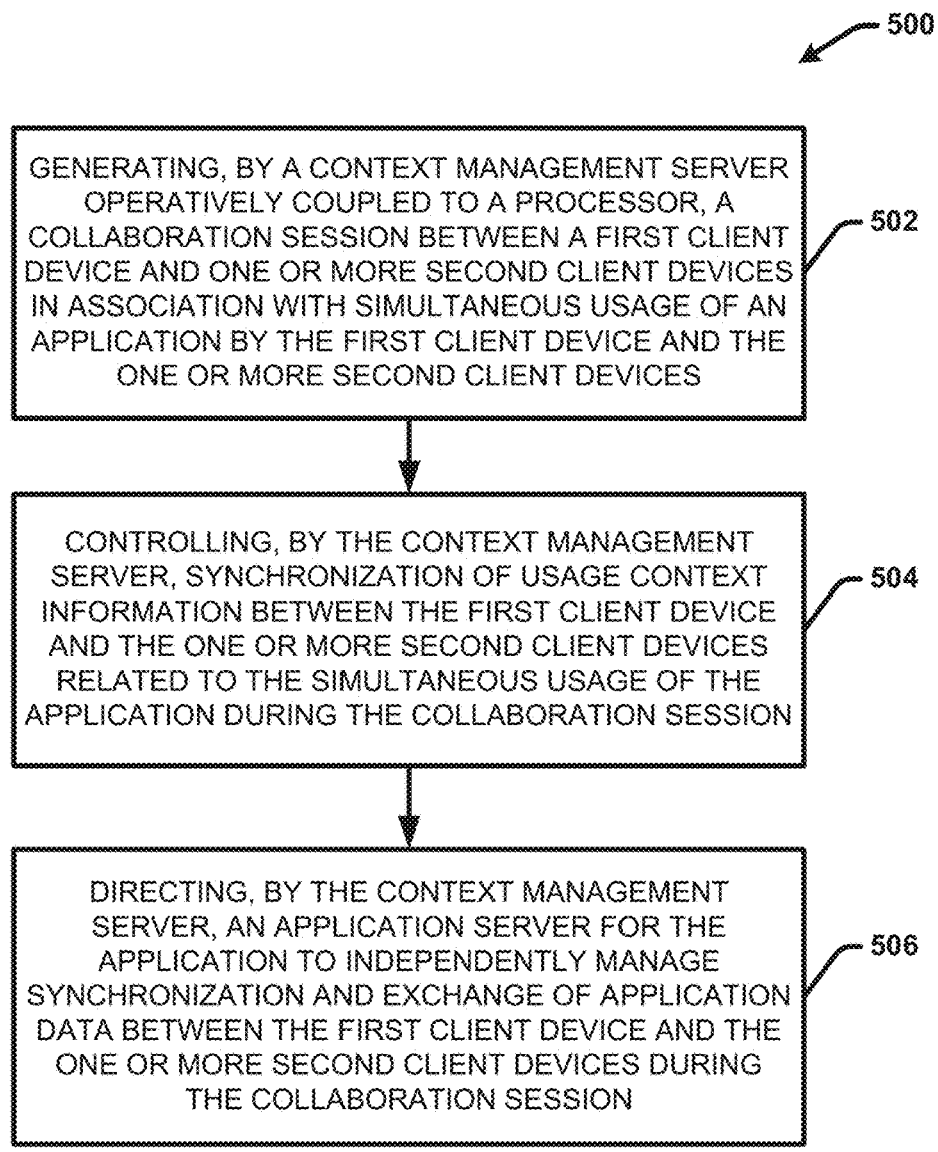
FIG. 5 illustrates a block diagram of an example, non-limiting computer implemented method for performing a collaboration session that distributes collaboration session context and data synchronization management between a context management server and the application server in accordance with one or more embodiments of the disclosed subject matter.

FIG. 5 illustrates a block diagram of an example, non-limiting computer implemented method 500 for performing a collaboration session that distributes collaboration session context and data synchronization management between a context management server and the application server in accordance with one or more embodiments of the disclosed subject matter. While, for purposes of simplicity of explanation, the methodologies described herein (e.g., method 500 and additional processes described herein) are shown and described as a series of acts, the disclosed subject matter is not limited by the order of acts, as some acts can occur in different orders and/or concurrently with other acts from that shown and described herein. For example, those skilled in the art will understand and appreciate that a methodology can alternatively be represented as a series of interrelated statuses or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices. Repetitive description of like elements employed in respective embodiments is omitted for sake of brevity.

With reference to FIG. 5, at 502, a context management server operatively coupled to a processor (e.g., context management server 130), generates a collaboration session between a first client device (e.g., initiating client device 102) and one or more second client devices (e.g., one or more joining client devices 108) in association with simultaneous usage of an application (e.g., defined by application logic 118 and provided by application server 116) by the first client device and the one or more second client devices. At 504, the context management server controls (e.g., using context management component 134) synchronization of usage context information between the first client device and the one or more second client devices related to the simultaneous usage of the application during the collaboration session. At 506, the context management server directs an application server for the application (e.g., application server 116) to independently manage synchronization and exchange of application data between the first client device and the one or more second applications during the collaboration session (e.g., using the data management component 124).

Figure 6:
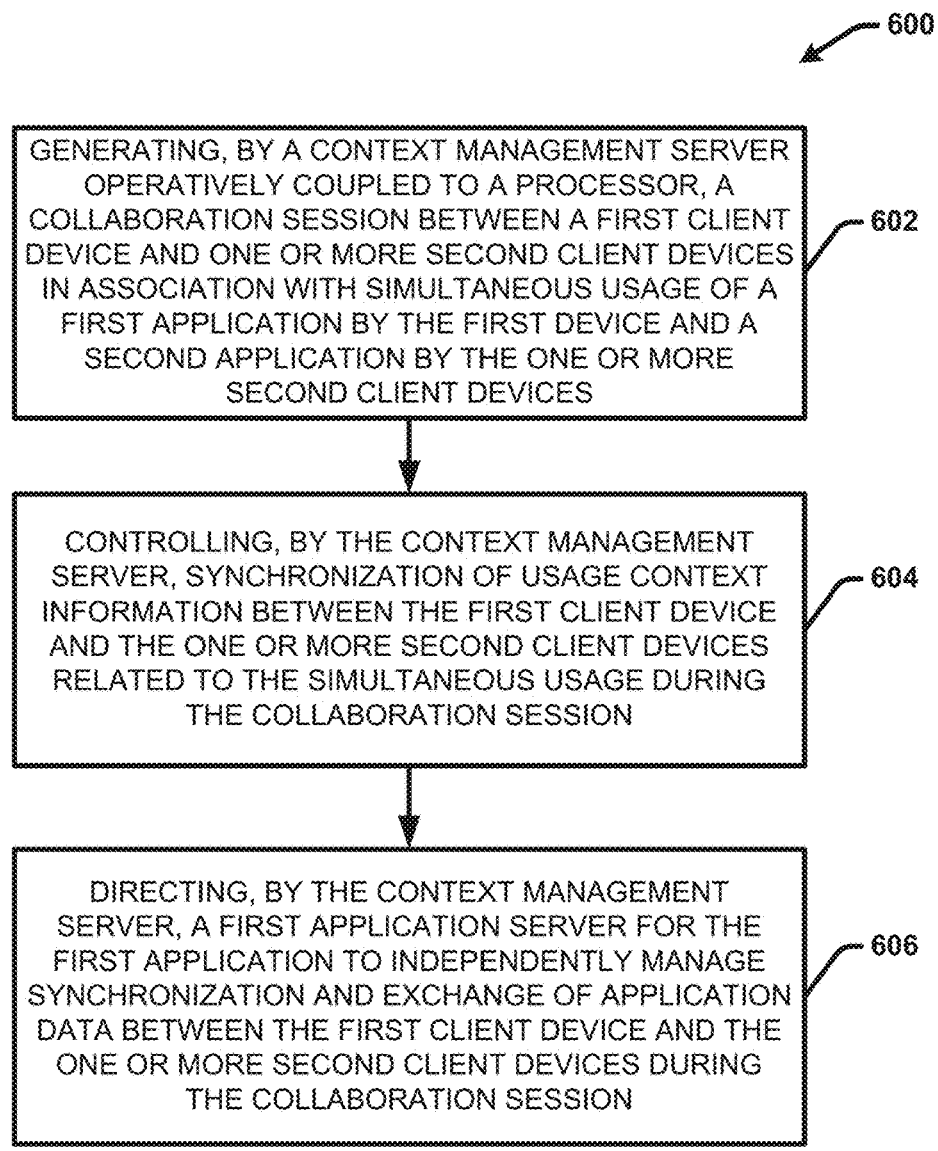
FIG. 6 illustrates a block diagram of another example, non-limiting computer implemented method for performing a collaboration session that distributes collaboration session context and data synchronization management between a context management server and the application server in accordance with one or more embodiments of the disclosed subject matter.

FIG. 6 illustrates a block diagram of another example, non-limiting computer implemented method 600 for performing a collaboration session that distributes collaboration session context and data synchronization management between a context management server and the application server in accordance with one or more embodiments of the disclosed subject matter.

In accordance with method 600, at 602, a context management server operatively coupled to a processor (e.g., context management server 130), generates a collaboration session between a first client device (e.g., initiating client device 102) and one or more second client devices (e.g., one or more joining client devices 108) in association with simultaneous usage of a first application by the first client device (e.g., client 1 session $120_1$) and a second application by the one or more second client devices (e.g., e.g., client 1 session $220_{2-K}$). At 604, the context management server controls (e.g., using context management component 134) synchronization of usage context information between the first client device and the one or more second client devices related to the simultaneous usage during the collaboration session. At 606, the context management server directs a first application server for the first application (e.g., application server 116) to independently manage synchronization and exchange of application data between the first client device and the one or more second applications during the collaboration session (e.g., using the data management component 124).

Figure 7:
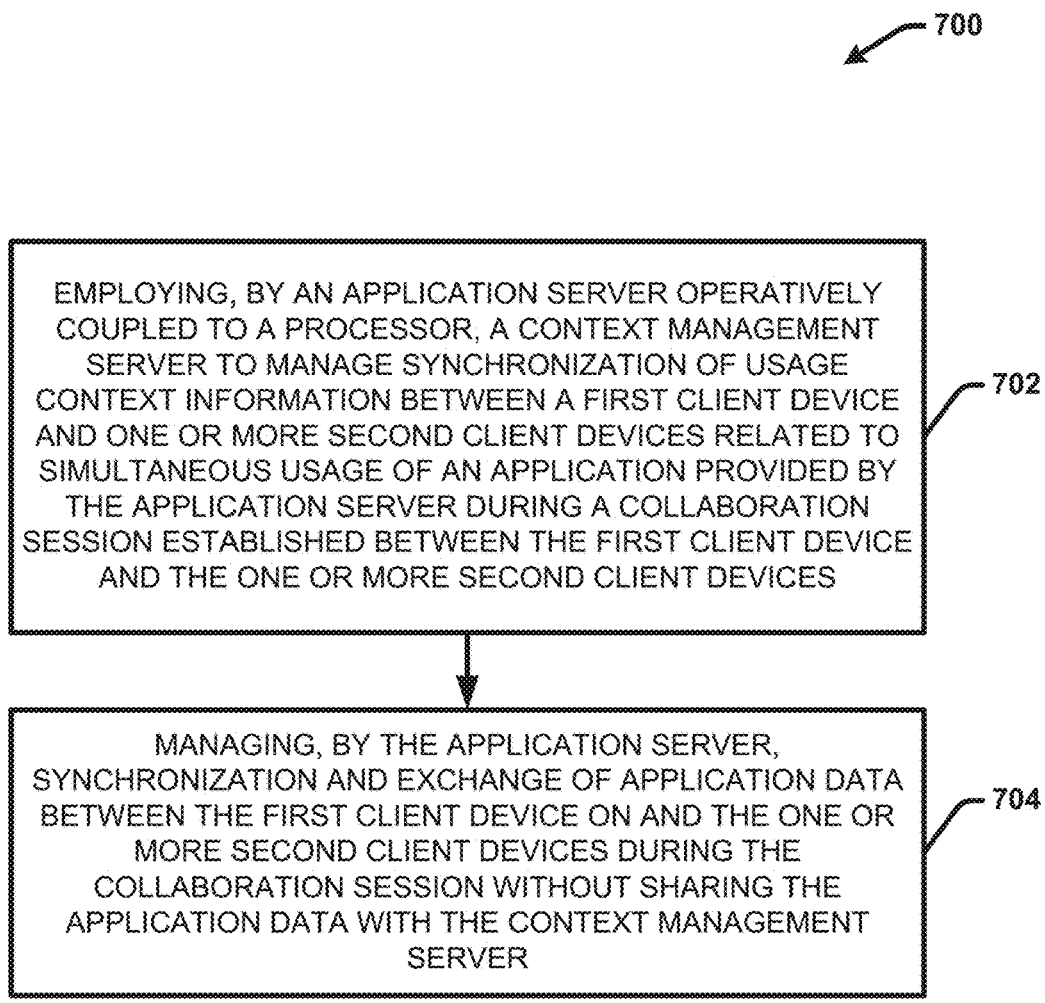
FIG. 7 illustrates a block diagram of another example, non-limiting computer implemented method for performing a collaboration session that distributes collaboration session context and data synchronization management between a context management server and the application server in accordance with one or more embodiments of the disclosed subject matter.

FIG. 7 illustrates a block diagram of another example, non-limiting computer implemented method 700 for performing a collaboration session that distributes collaboration session context and data synchronization management between a context management server and the application server in accordance with one or more embodiments of the disclosed subject matter.

At 702, method 700 comprises employing, by an application server operatively coupled to a processor (e.g., application server 116), a context management service (e.g., provided by context management server 130) to manage synchronization of usage context information between a first client device (e.g., initiating client device 102) and one or more second client devices (e.g., one or more joining client device 108) related to simultaneous usage of an application provided by the application (e.g., defined by application logic 118) server during a collaboration session established between the first client device and the one or more second client devices. At 704, method 700 further comprises managing, by the application server (e.g., using data management component 124), synchronization and exchange of application data between the first client device on and the one or more second client devices during the collaboration session without sharing the application data with the context management service.

One or more embodiments can be a system, a method, and/or a computer program product at any possible technical detail level of integration. The computer program product can include a computer readable storage medium (or media)

having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 8, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 8:
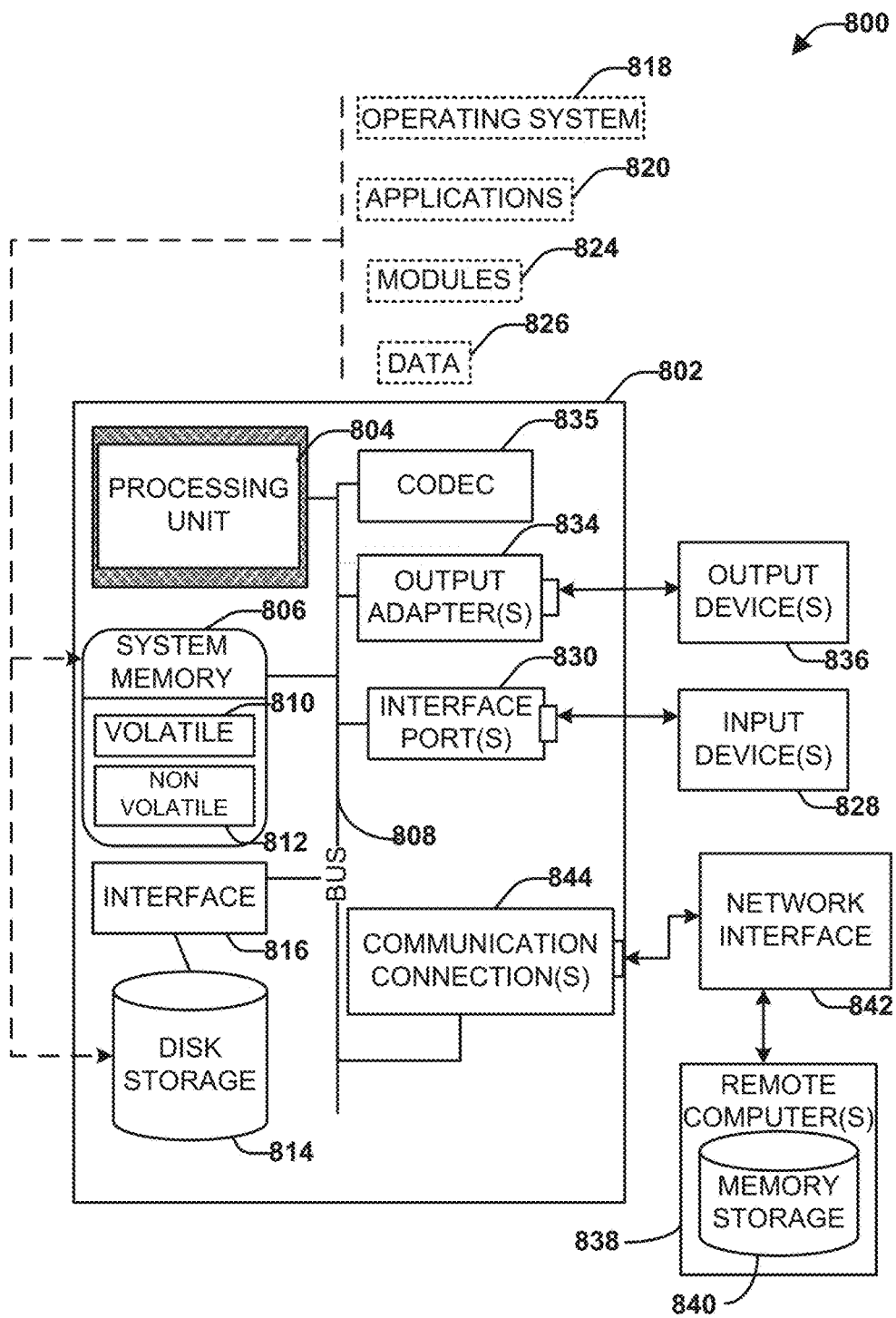
FIG. 8 illustrates a block diagram of an example, non-limiting operating environment in which one or more embodiments described herein can be facilitated.

With reference to FIG. 8, an example environment 800 for implementing various aspects of the claimed subject matter includes a computer 802. The computer 802 includes a processing unit 804, a system memory 806, a codec 835, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 806 includes volatile memory 810 and non-volatile memory 812, which can employ one or more of the disclosed memory architectures, in various embodiments. The basic input/output system (BIOS), containing the basic routines to transfer information between elements within the computer 802, such as during start-up, is stored in non-volatile memory 812. In addition, according to present innovations, codec 835 can include at least one of an encoder or decoder, wherein the at least one of an encoder or decoder can consist of hardware, software, or a combination of hardware and software. Although, codec 835 is depicted as a separate component, codec 835 can be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 812 can employ one or more of the disclosed memory devices, in at least some embodiments. Moreover, non-volatile memory 812 can be computer memory (e.g., physically integrated with computer 802 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 810 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 802 can also include removable/non-removable, volatile/non-volatile computer storage medium. FIG. 8 illustrates, for example, disk storage 814. Disk storage 814 includes, but is not limited to, devices like a magnetic disk drive, solid state disk (SSD), flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 814 to the system bus 808, a removable or non-removable interface is typically used, such as interface 816. It is appreciated that disk storage 814 can store information related to an entity. Such information might be stored at or provided to a server or to an application running on an entity device. In one embodiment, the entity can be notified (e.g., by way of output device(s) 836) of the types of information that are stored to disk storage 814 or transmitted to the server or application. The entity can be provided the opportunity to opt-in or opt-out of having such information collected or shared with the server or application (e.g., by way of input from input device(s) 828).

It is to be appreciated that FIG. 8 describes software that acts as an intermediary between entities and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

An entity enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port can be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 9:
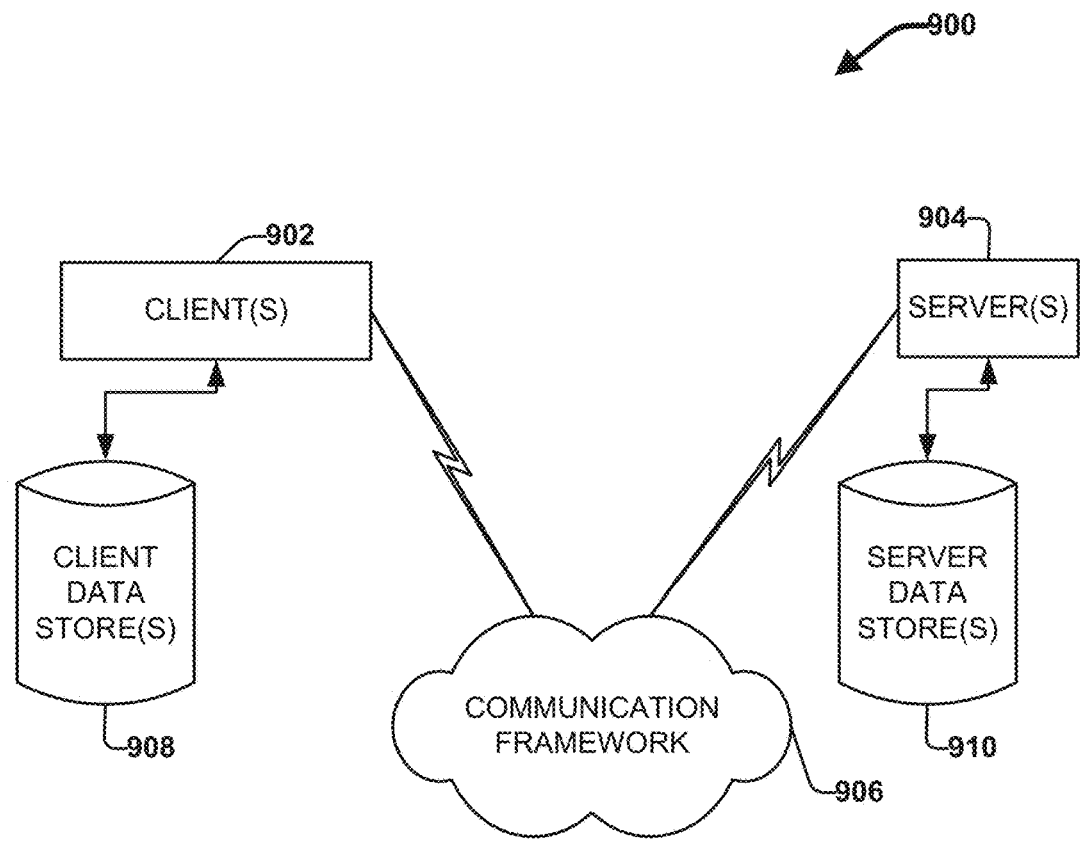
FIG. 9 illustrates a block diagram of another example, non-limiting operating environment in which one or more embodiments described herein can be facilitated.

Referring to FIG. 9, there is illustrated a schematic block diagram of a computing environment 900 in accordance with this disclosure in which the subject systems (e.g., system 100, system 200, and the like), methods and computer readable media can be deployed. The computing environment 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The computing environment 900 also includes one or more server(s) 904. The server(s) 904 can also be hardware or hardware in combination with software (e.g., threads, processes, computing devices). The servers 904 can house threads to perform transformations by employing aspects of this disclosure, for example. In various embodiments, one or more components, devices, systems, or subsystems of system 100 and/or system 200 can be deployed as hardware and/or software at a client 902 and/or as hardware and/or software deployed at a server 904. One possible communication between a client 902 and a server 904 can be in the form of a data packet transmitted between two or more computer processes wherein the data packet may include healthcare related data, training data, AI models, input data for the AI models and the like. The data packet can include a metadata, e.g., associated contextual information, for example. The computing environment 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include or are operatively connected to one or more client data store(s) 908 that can be employed to store information local to the client(s) 902 (e.g., associated contextual information). Similarly, the server(s) 904 are operatively include or are operatively connected to one or more server data store(s) 910 that can be employed to store information local to the servers 904 (e.g., application data).

In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

Figure 10:
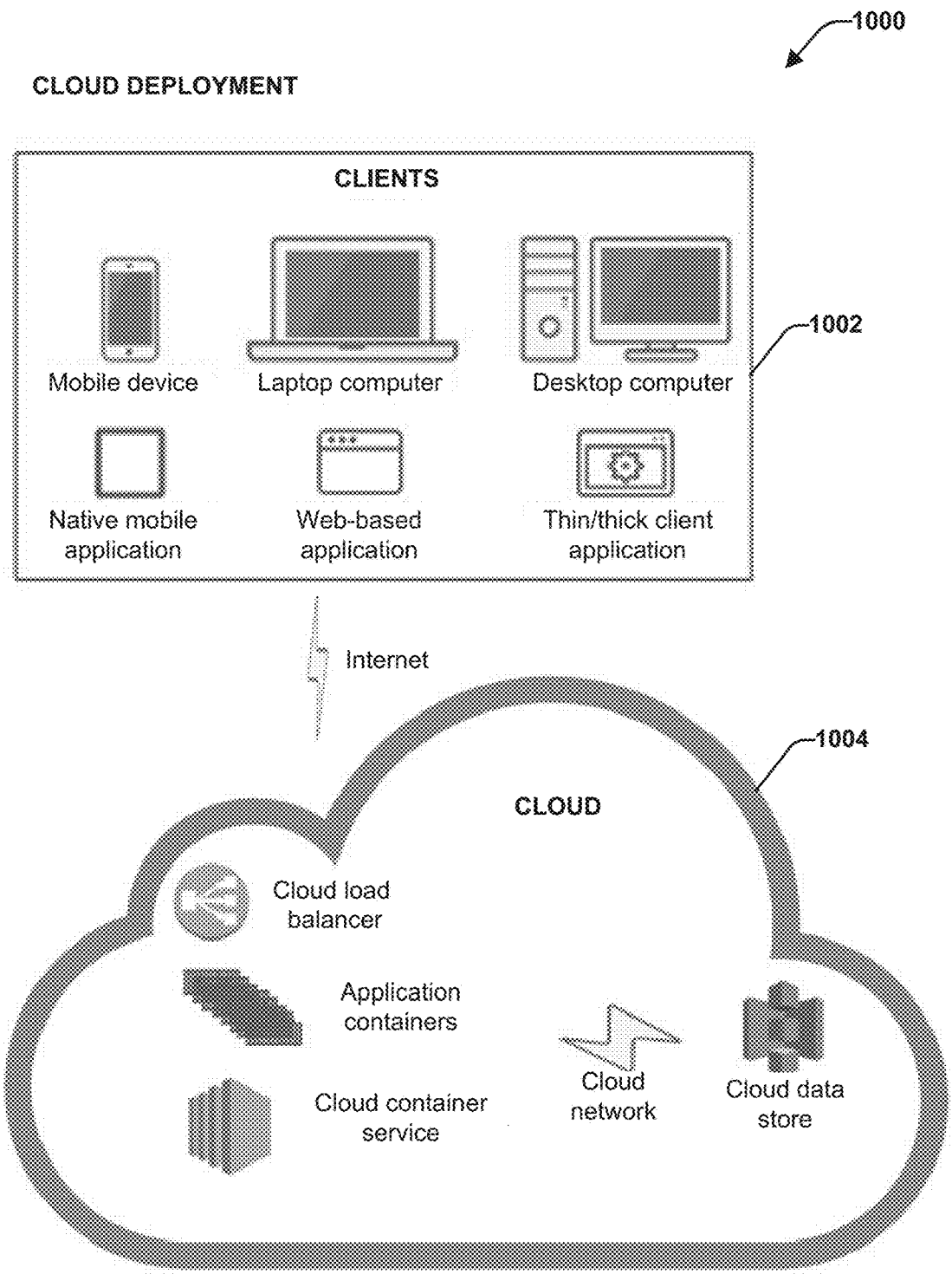
FIG. 10 illustrates a block diagram of another example, non-limiting operating environment in which one or more embodiments described herein can be facilitated.

FIG. 10 illustrates a schematic block diagram of another example computing environment 1000 in accordance with this disclosure in which the subject systems (e.g., system 100, system 200 and the like), methods and computer readable media can be deployed. The computing environment 1000 includes a cloud deployment architecture consisting of one or more clients 1002 that can be communicatively coupled to a system cloud 1004 via a network (e.g., the Internet). The system cloud 1004 can include a cloud load balances, one or more application container, one or more cloud service containers, a cloud data store, and a cloud network that communicatively couples the one or more cloud components to the cloud data store. In accordance with the cloud deployment architecture, the clients 1002 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject application collaboration systems (e.g., system 100, system 200, and the like) deployed in the system cloud 1004. In various implementations, the one or more components of systems 100 and/or system 200 can be distributed between the clients 1002 and the system cloud 1004.

Figure 11:
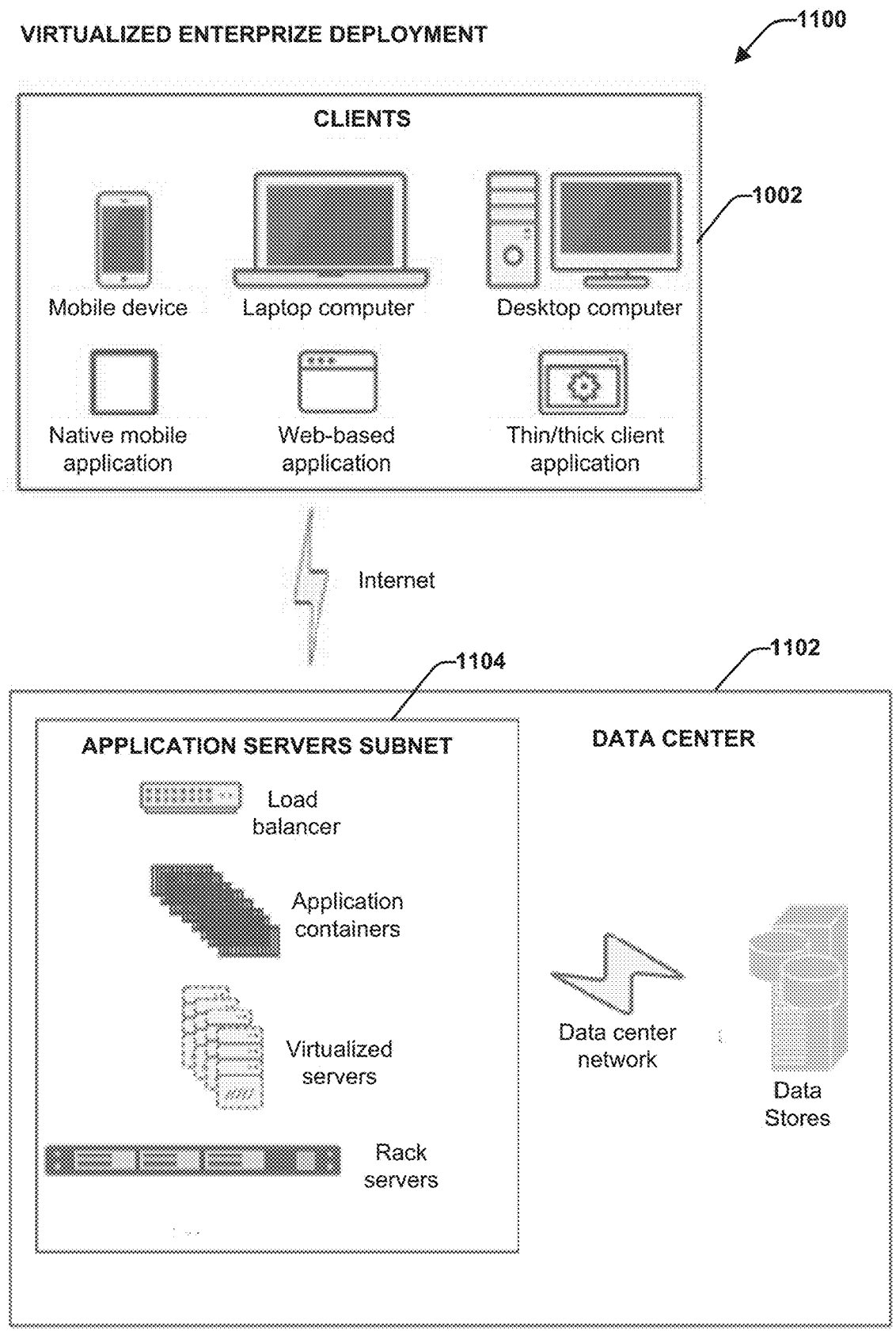
FIG. 11 illustrates a block diagram of another example, non-limiting operating environment in which one or more embodiments described herein can be facilitated.

FIG. 11 illustrates a schematic block diagram of another example computing environment 1100 in accordance with this disclosure in which the subject systems (e.g., system 100, system 200 and the like), methods and computer readable media can be deployed. The computing environment 1100 includes a virtualized enterprise deployment consisting of one or more clients 1002 that can be communicatively coupled to a remote data center 1102 via a network (e.g., the Internet). The remote data center 1102 can include an application servers subnet 1104 which can provide a load balancer, one or more application containers, one or more virtualized servers and one or more rack servers. The data center 1102 can also include one or more data stores that can be communicatively coupled to the application servers subnet 1104 via a data center network. In accordance with the virtualized enterprise deployment, the clients 1002 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject application collaboration systems (e.g., system 100, system 200 and the like) deployed in the data center 1102 and application servers subnet 1104. In various implementations, the one or more components of system 100 and/or system 200 can be distributed between the clients 1002 and the application servers subnet 1104 and the data center 1802.

Figure 12:
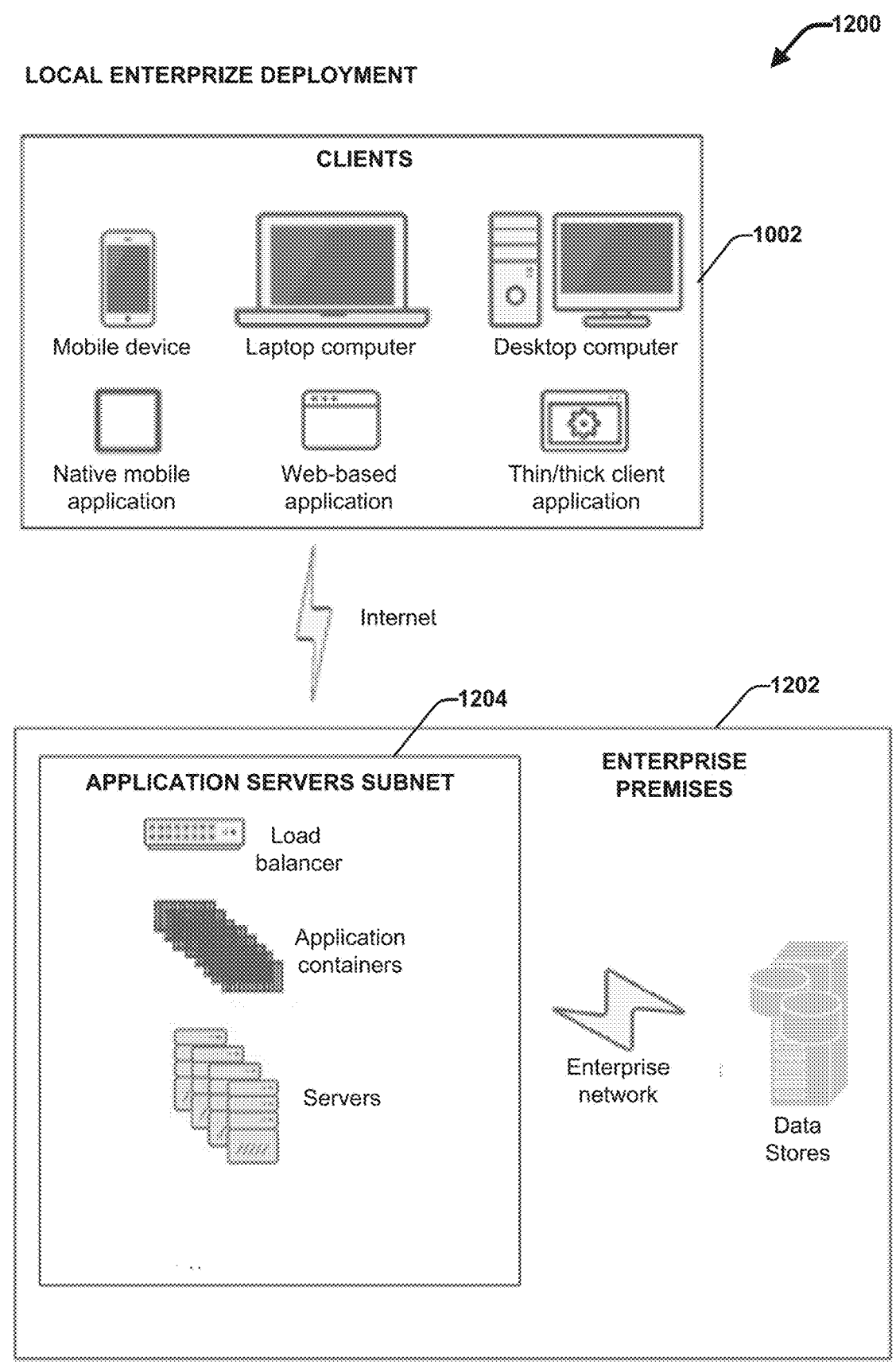
FIG. 12 illustrates a block diagram of another example, non-limiting operating environment in which one or more embodiments described herein can be facilitated.

FIG. 12 illustrates a schematic block diagram of another example computing environment 1200 in accordance with this disclosure in which the subject systems (e.g., system 100, system 200 and the like), methods and computer readable media can be deployed. The computing environment 1200 includes a local enterprise deployment consisting of one or more clients 1002 that can be communicatively coupled to an application servers subnet 1204 via a network (e.g., the Internet). In accordance with this embodiment, the application servers subnet 1204 can be provided at the enterprise premises 1202 (e.g., as opposed to a remote data center 1202). The application servers subnet 1204 can include a load balancer, one or more application containers and one or more servers. The application servers subnet 1204 can be communicatively coupled to one or more data stores provided at the enterprise premises 1202 via an enterprise network. Similar to the cloud and virtualized enterprise deployments, the clients 1002 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject application collaboration systems (e.g., system 100, system 200 and the like) deployed at the enterprise premises 1202 and the application servers subnet 1204. In various implementations, the one or more components of system 100 and/or system 200 can be distributed between the clients 1002 and the application servers subnet 1204 and the enterprise premises 1202.

Figure 13:
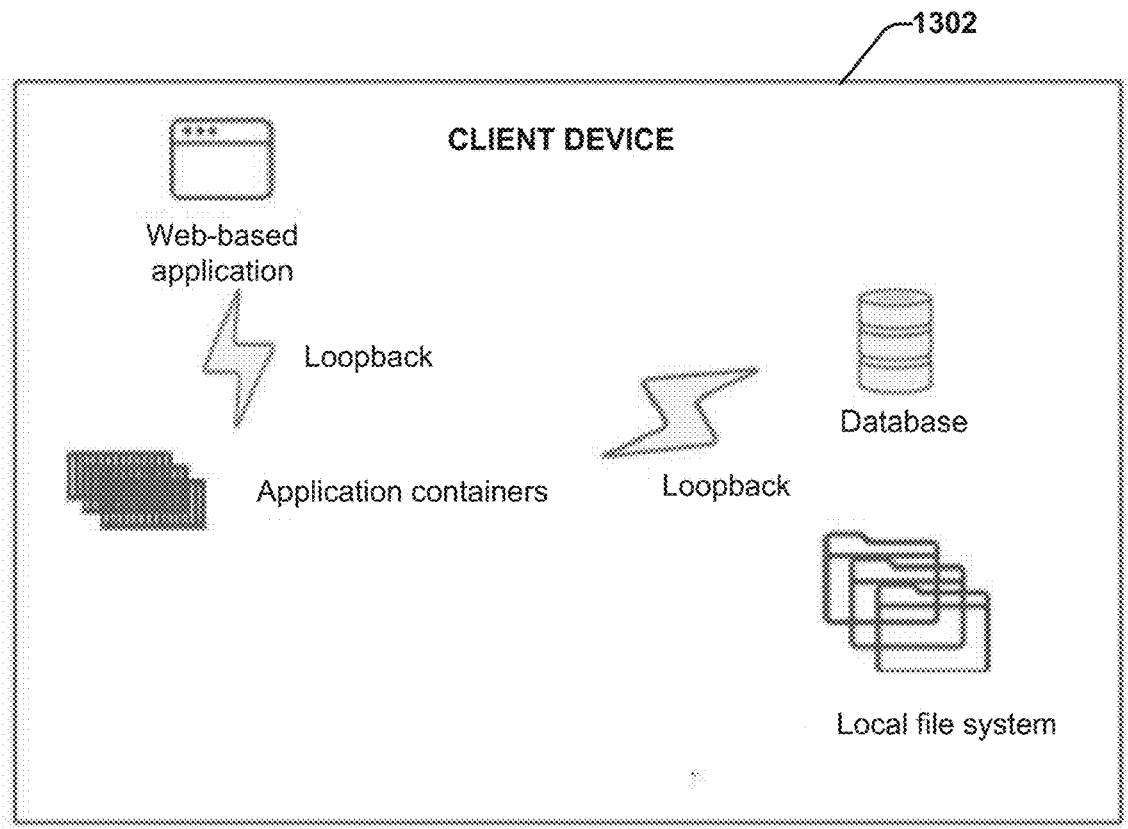
FIG. 13 illustrates a block diagram of another example, non-limiting operating environment in which one or more embodiments described herein can be facilitated.

FIG. 13 illustrates a schematic block diagram of another example computing environment 1300 in accordance with this disclosure in which the subject systems (e.g., system 100, system 200, and the like), methods and computer readable media can be deployed. The computing environment 1300 includes a local device deployment in which all of the components of system 100 and/or system 200 are provided at a single client device 1302. With this implementation, the client device 1302 can include a web-based application which can be communicatively coupled via a loopback to one or more application containers. The one or more application containers can be communicatively coupled via a loopback to one or more databases and/or one or more local file systems.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer executable components stored in the memory, wherein the computer executable components comprise:
  a session creation component that controls generating a collaboration session between a first client device and one or more second client devices, the one or more second client devices having been added to the collaboration session after receiving an invitation or session ID to join the collaboration session from the session creation component, in association with real-time simultaneous usage of an application by the first client device and the one or more second client devices, wherein based on the generating, the session creation component directs an application server for the application to manage synchronization and exchange of application data between the first client device and the one or more second client devices during the collaboration session; and
  a context management component that controls synchronization of usage context information between the first client device and the one or more second client devices related to the real-time simultaneous usage of the application and application data during the collaboration session;
 wherein the session creation component and the context management component are deployed at a context management server remote from the application server and the client devices, and
 wherein the application server independently manages the synchronization and the exchange of the application data without distributing the application data to the context management server.

2. The system of claim 1, wherein the application server comprises a first application server accessed by the first client device in association with a request to initiate the collaboration session, wherein the one or more second client devices access the application via one or more second application servers, and wherein the collaboration session creation component directs the first application server to manage the synchronization and exchange of the application data based on the first application server receiving the request.

3. The system of claim 1, wherein the session creation component and the context management component are deployed at a context management server remote from the application server, and wherein the context management server does not receive the application data during the collaboration session.

4. The system of claim 1, wherein the usage context information comprises event information regarding user actions performed in association with interaction with the application data as displayed by the first client device and the one or more second client devices.

5. The system of claim 1, wherein the usage context information comprises metadata associated with the application data.

6. The system of claim 1, wherein the application comprises a web-application simultaneously accessed and employed by the first client device and the one or more second client devices.

7. The system of claim 1, wherein the session creation component creates the collaboration session in response to reception of a request from the application server initiated by the first client device, and wherein based on reception of the request, the session creation component generates a session identifier for the collaboration session, assigns the first client device an initiator participant role for the collaboration session, and provides the application server with collaboration session information comprising the session identifier and identifying the first client device as having the participant initiator role.

8. The system of claim 7, wherein the session creation component controls joining the one or more second client devices to the collaboration session based on the collaboration session information, and wherein based on the joining, the session creation component assigns the one or more second client devices a joining participant role for the collaboration session.

9. The system of claim 1, wherein the application comprises a clinical application and wherein the application data comprises clinical data selected from the group consisting of: medical image data, clinical document data, and patient data.

10. The system of claim 9, wherein usage context information comprises user interactions with the clinical data in association with the usage the application by the first client device and the one or more second client devices.

11. A system, comprising:
a memory that stores computer executable components; and
a processor that executes the computer executable components stored in the memory, wherein the computer executable components comprise:
  a session creation component that controls generating a collaboration session between a first client device and one or more second client devices, the one or more second client devices having been added to the collaboration session after receiving an invitation or session ID to join the collaboration session from the session creation component, in association with real-time simultaneous usage of a first application by the first client device and a second application by the one or more second client devices, wherein based on the generating, the collaboration session creation component directs a first application server for the first application to manage synchronization and exchange of application data between the first client device and the one or more second client devices during the collaboration session; and
  a context management component that controls synchronization of usage context information between the first client device and the one or more second client devices related to the real-time simultaneous usage during the collaboration session;
wherein the session creation component and the context management component are deployed at context management server remote from the first application server and the client devices, and
wherein the first application server independently manages the synchronization and the exchange of the application data without distributing the application data to the context management server.

12. The system of claim 1, further comprising a data management component on the application server to determine when an initiator client device has changed the application data for the session, and to direct the participant client devices to display the changed application data according to the changes on the initiator client device.

13. The system of claim 11, wherein the usage context information comprises event information regarding user actions performed in association with interaction with the application data as displayed by the first client device and the one or more second client devices.

14. The system of claim 11, wherein the first application and the second application comprise different applications and wherein the second application is served by a second application servers accessed by the one or more second client devices, and wherein based on the generating, the session creation component directs the first application server to distribute the application to the one or more second application servers for sharing with the one or more second client devices.

15. The system of claim 11, wherein the session creation component creates the collaboration session in response to reception of a request from the first application server initiated by the first client device, and wherein based on reception of the request, the session creation component generates a session identifier for the collaboration session, assigns the first client device an initiator participant role for the collaboration session, and provides the first application server with collaboration session information comprising the session identifier and identifying the first client device as having the participant initiator role.

16. The system of claim 15, wherein the session creation component controls joining the one or more second client devices to the collaboration session based on the collaboration session information, and wherein based on the joining, the session creation component assigns the one or more second applications a joining participant role for the collaboration session.

17. The system of claim 16, wherein the session creation component further directs the first application server to share the collaboration session information with the one or more second application servers, and wherein based on sharing the collaboration session information, the one or more second application servers use the collaboration session information to facilitate the joining of the one or more second client devices to the collaboration session.

18. The system of claim 11, wherein the first application and the second application comprise clinical applications and wherein the application data comprises clinical data selected from the group consisting of: medical image data, clinical document data, and patient data.

19. The system of claim 11, further comprising a data management component on the application server to determine when an initiator client device has changed the application data for the session, and to direct the participant client devices to display the changed application data according to the changes on the initiator client device.

* * * * *